United States Patent
Liguori et al.

(10) Patent No.: US 11,659,058 B2
(45) Date of Patent: May 23, 2023

(54) PROVIDER NETWORK CONNECTIVITY MANAGEMENT FOR PROVIDER NETWORK SUBSTRATE EXTENSIONS

(71) Applicant: Amazon Technologies, Inc., Seattle, WA (US)

(72) Inventors: Anthony Nicholas Liguori, Bainbridge Island, WA (US); Eric Samuel Stone, Seattle, WA (US); Richard H. Galliher, Seattle, WA (US); David James Goodell, Seattle, WA (US); Patrick John Lawrence, Bothell, WA (US); Yang Lin, Seattle, WA (US); William Ashley, Seattle, WA (US); Steven Anthony Kady, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/457,824

(22) Filed: Jun. 28, 2019

(65) Prior Publication Data
US 2020/0412824 A1   Dec. 31, 2020

(51) Int. Cl.
*H04L 67/561* (2022.01)
*H04L 12/46* (2006.01)
*H04L 67/564* (2022.01)

(52) U.S. Cl.
CPC ........ *H04L 67/561* (2022.05); *H04L 12/4633* (2013.01); *H04L 12/4641* (2013.01); *H04L 67/564* (2022.05)

(58) Field of Classification Search
CPC ............. H04L 12/4633; H04L 12/4641; H04L 67/2804; H04L 67/2819
USPC ................................................... 709/217–222
See application file for complete search history.

(56) References Cited

U.S. PATENT DOCUMENTS

| | | | |
|---|---|---|---|
| 5,007,027 | A | 4/1991 | Shimoi |
| 5,301,281 | A | 4/1994 | Kennedy |
| 5,526,510 | A | 6/1996 | Akkary et al. |
| 5,761,725 | A | 6/1998 | Zeller et al. |

(Continued)

OTHER PUBLICATIONS

D. Salomoni and M. Caberletti, "A Dynamic Virtual Networks Solution for Cloud Computing," 2012 SC Companion: High Performance Computing, Networking Storage and Analysis, 2012, pp. 526-534 (Year: 2012).*

(Continued)

*Primary Examiner* — Taylor A Elfervig
(74) *Attorney, Agent, or Firm* — Nicholson De Vos Webster & Elliott LLP

(57) ABSTRACT

A first service of a provider network obtains an identification of one or more substrate addressable devices included in an extension of the provider network. Based on the identification, a launch of one or more compute instances within the provider network is initiated. The one or more compute instances are to connect the provider network to the extension of the provider network across at least a third-party network by receiving a first control plane message directed to a first substrate addressable device of the one or more substrate addressable devices, by updating a message state data store based at least in part on the first control plane message, and by sending a second control plane message to the first substrate addressable device via a secure tunnel.

20 Claims, 10 Drawing Sheets

(56) References Cited

U.S. PATENT DOCUMENTS

| | | | |
|---|---|---|---|
| 5,768,558 | A | 6/1998 | Iyengar et al. |
| 8,601,134 | B1 | 12/2013 | Sorenson, III et al. |
| 8,789,208 | B1 | 7/2014 | Sundaram et al. |
| 8,793,343 | B1* | 7/2014 | Sorenson, III ........ G06F 16/183 |
| | | | 709/219 |
| 8,832,039 | B1 | 9/2014 | Sorenson, III et al. |
| 9,323,552 | B1 | 4/2016 | Adogla et al. |
| 9,635,132 | B1 | 4/2017 | Lin et al. |
| 9,692,729 | B1 | 6/2017 | Chen et al. |
| 9,813,379 | B1* | 11/2017 | Shevade ............. H04L 41/5051 |
| 9,942,787 | B1* | 4/2018 | Tillotson ............... H04W 24/08 |
| 9,954,763 | B1 | 4/2018 | Ye et al. |
| 10,185,507 | B1 | 1/2019 | Olson et al. |
| 10,268,593 | B1 | 4/2019 | Olson et al. |
| 10,298,670 | B2 | 5/2019 | Ben-Shaul et al. |
| 10,333,789 | B1 | 6/2019 | Dippenaar et al. |
| 10,924,340 | B1 | 2/2021 | Iyengar et al. |
| 11,044,118 | B1 | 6/2021 | Reed et al. |
| 2002/0077177 | A1 | 6/2002 | Elliott |
| 2006/0253555 | A1 | 11/2006 | Leung |
| 2008/0281908 | A1 | 11/2008 | McCanne et al. |
| 2008/0313474 | A1 | 12/2008 | Kahn et al. |
| 2009/0022120 | A1* | 1/2009 | Buer ....................... G09G 5/005 |
| | | | 370/338 |
| 2009/0077097 | A1 | 3/2009 | Lacapra et al. |
| 2011/0131443 | A1 | 6/2011 | Laor et al. |
| 2012/0096106 | A1* | 4/2012 | Blumofe ................. H04L 67/06 |
| | | | 709/213 |
| 2013/0007219 | A1 | 1/2013 | Sorenson et al. |
| 2013/0007854 | A1 | 1/2013 | Sorenson, III et al. |
| 2013/0031307 | A1 | 1/2013 | Itoh |
| 2013/0044962 | A1 | 2/2013 | Kim et al. |
| 2014/0108665 | A1 | 4/2014 | Arora et al. |
| 2014/0149748 | A1 | 5/2014 | Ang et al. |
| 2014/0237594 | A1 | 8/2014 | Thakadu et al. |
| 2014/0372381 | A1 | 12/2014 | Sorenson, III et al. |
| 2015/0089034 | A1* | 3/2015 | Stickle ................... H04L 41/18 |
| | | | 709/223 |
| 2015/0134795 | A1 | 5/2015 | Theimer et al. |
| 2015/0134796 | A1 | 5/2015 | Theimer et al. |
| 2016/0026573 | A1 | 1/2016 | Jacobs et al. |
| 2016/0077845 | A1 | 3/2016 | Earl et al. |
| 2016/0205187 | A1 | 7/2016 | Sorenson et al. |
| 2016/0294854 | A1 | 10/2016 | Parthasarathi et al. |
| 2017/0054680 | A1 | 2/2017 | Ito |
| 2018/0067854 | A1 | 3/2018 | Kaminski et al. |
| 2018/0152501 | A1 | 5/2018 | Sorenson et al. |
| 2018/0173561 | A1 | 6/2018 | Moroski et al. |
| 2018/0232308 | A1 | 8/2018 | Kusters et al. |
| 2018/0329831 | A1 | 11/2018 | Sampathkumar et al. |
| 2019/0253274 | A1* | 8/2019 | Van Dussen ............ H04L 43/12 |
| 2019/0278700 | A1 | 9/2019 | Ranjan et al. |
| 2020/0136825 | A1 | 4/2020 | Gupta et al. |
| 2020/0320046 | A1 | 10/2020 | Narayanamurthy et al. |
| 2020/0351235 | A1 | 11/2020 | Shang et al. |
| 2020/0356831 | A1 | 11/2020 | Principato |

OTHER PUBLICATIONS

D. Kakadia and V. Varma, "Network Virtualization Platform for Hybrid Cloud," 2013 IEEE 5th International Conference on Cloud Computing Technology and Science, 2013, pp. 69-74, (Year: 2013).*

K. Bakshi, "Considerations for Software Defined Networking (SDN): Approaches and use cases," 2013 IEEE Aerospace Conference, 2013, pp. 1-9 (Year: 2013).*

U.S. Appl. No. 15/385,814, filed Dec. 20, 2016.
U.S. Appl. No. 15/385,767, filed Dec. 20, 2016.
U.S. Appl. No. 15/385,815, filed Dec. 20, 2016.
U.S. Appl. No. 16/196,723, filed Nov. 20, 2018.
U.S. Appl. No. 16/196,736, filed Nov. 20, 2018.
U.S. Appl. No. 16/457,841, Pending.
U.S. Appl. No. 16/457,831, Pending.
U.S. Appl. No. 16/457,838, Pending.
U.S. Appl. No. 16/457,856, Pending.
U.S. Appl. No. 16/457,853, Pending.
U.S. Appl. No. 16/457,827, Pending.
U.S. Appl. No. 16/457,850, Pending.
Non-Final Office Action, U.S. Appl. No. 16/457,827, dated Jul. 28, 2020, 10 pages.
Non-Final Office Action, U.S. Appl. No. 16/457,841, dated Jul. 28, 2020, 11 pages.
International Search Report and Written Opinion for International Application No. PCT/US2020/039859, dated Oct. 14, 2020, 14 pages.
Non-Final Office Action for U.S. Appl. No. 16/457,821, dated Nov. 18, 2020, 10 pages.
Advisory Action, U.S. Appl. No. 16/457,841, dated Apr. 9, 2021, 6 pages.
Final Office Action, U.S. Appl. No. 16/457,841, dated Jan. 26, 2021, 10 pages.
Final Rejection, U.S. Appl. No. 16/457,827, dated Jan. 26, 2021, 11 pages.
International Search Report and Written Opinion, PCT/US2020/039859, dated Oct. 14, 2020, 14 pages.
Microsoft "Microsoft Cloud Networking for Enterprise Architects", Microsoft Corporation, Dec. 2016, 12 pages.
Notice of Allowance, U.S. Appl. No. 16/457,831, dated Feb. 26, 2021, 10 pages.
Non-Final Office Action, U.S. Appl. No. 16/457,827, dated Jun. 23, 2021, 12 pages.
Non-Final Office Action, U.S. Appl. No. 16/457,841, dated Jul. 30, 2021, 12 pages.
Bart Spinnewyn; Towards a Fluid Cloud: An Extension of the Cloud into the Local Network; SPRINGER:2015; pp. 61-65.
Final Office Action, U.S. Appl. No. 16/457,827, dated Dec. 9, 2021, 11 pages.
Final Office Action, U.S. Appl. No. 16/457,841, dated Jan. 24, 2022, 11 pages.
International Preliminary Report on Patentability, PCT App. No. PCT/US2020/039859, dated Jan. 6, 2022, 10 pages.
Non-Final Office Action, U.S. Appl. No. 16/457,838, dated Dec. 24, 2021, 7 pages.
Non-Final Office Action, U.S. Appl. No. 17/330,350, dated Nov. 18, 2021, 19 pages.
Final Office Action, U.S. Appl. No. 17/330,350, dated Apr. 18, 2022, 11 pages.
Notice of Allowance, U.S. Appl. No. 16/457,838, dated Apr. 18, 2022, 8 pages.
Notice of Allowance, U.S. Appl. No. 16/457,841, dated Apr. 6, 2022, 7 pages.
Notice of Allowance, U.S. Appl. No. 16/457,827, dated Feb. 28, 2022, 7 pages.
Office Action, EP App. No. 20742587.7, dated May 16, 2022, 9 pages.
Notice of Allowance, U.S. Appl. No. 17/330,350, dated Aug. 31, 2022, 11 pages.
Non-Final Office Action, U.S. Appl. No. 17/330,350, dated Aug. 31, 2022, 11 pages.

* cited by examiner

US 11,659,058 B2

PROVIDER NETWORK CONNECTIVITY MANAGEMENT FOR PROVIDER NETWORK SUBSTRATE EXTENSIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A wide variety of virtual machine types, optimized for different types of applications such as compute-intensive applications, memory-intensive applications, and the like may be set up at the data centers of some cloud computing provider networks in response to client requests. In addition, higher-level services that rely upon the virtual computing services of such provider networks, such as some database services whose database instances are instantiated using virtual machines of the virtual computing services, may also be made available to provider network clients. For some types of applications, however, such as applications that process very large amounts of data that has to be stored at customer premises outside the provider network, services that are limited to providing virtualized resources using hardware located at data centers of the provider network may not be optimal, e.g., for latency-related and/or other reasons.

BRIEF DESCRIPTION OF DRAWINGS

Various embodiments in accordance with the present disclosure will be described with reference to the following drawings.

DETAILED DESCRIPTION

Figure 1:
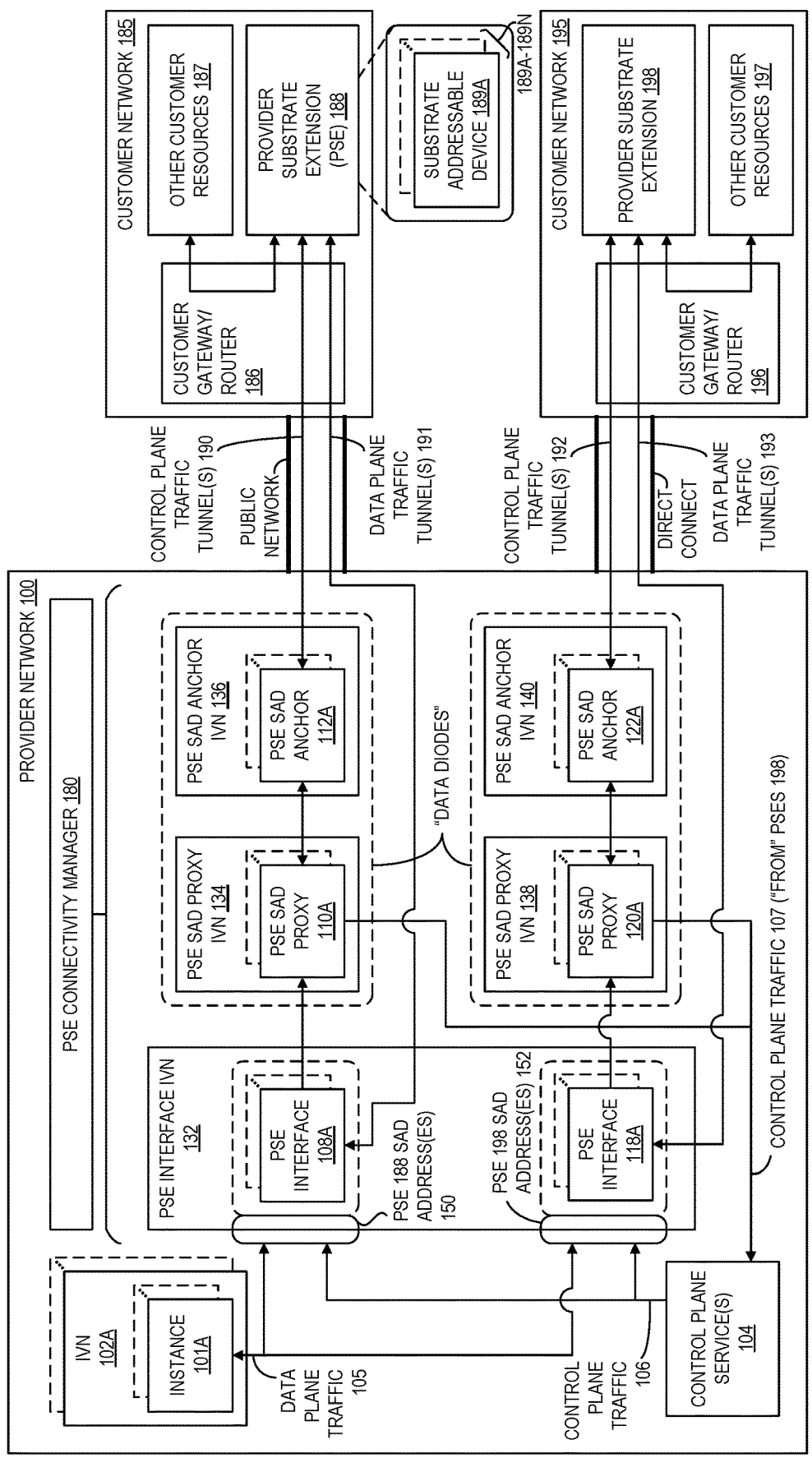
FIG. 1 is a block diagram illustrating an example provider network extended by a provider substrate extension located within a network external to the provider network according to at least some embodiments.

The present disclosure relates to methods, apparatus, systems, and non-transitory computer-readable storage media for configuring a provider substrate extension for communication with a network external to a provider network. A provider network operator (or provider) provides its users (or customers) with the ability to utilize one or more of a variety of types of computing-related resources such as compute resources (e.g., executing virtual machines (VMs) and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services.

Provider network operators often offer these and other computing resources as services that rely upon virtualization techniques. For example, virtualization technologies may be used to provide users the ability to control or utilize compute instances (e.g., a VM using a guest operating system (OS) that operates using a hypervisor that may or may not further operate on top of an underlying host OS, a container that may or may not operate in a VM, an instance that can execute on "bare metal" hardware without an underlying hypervisor), where one or multiple compute instances can be implemented using a single electronic device. Thus, a user may directly utilize a compute instance provided by an instance management service (sometimes called a hardware virtualization service) hosted by the provider network to perform a variety of computing tasks. Additionally or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The resources that support both the services offering computing-related resources to users and those computing-related resources provisioned to users may be generally referred to as the provider network substrate. Such resources typically include hardware and software in the form of many networked computer systems. The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the provider network (e.g., computing instances, containers, block storage volumes, databases, file storage). Data plane traffic generally includes non-administrative operations such as transferring data to and from the customer resources. The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

While some customer applications are readily migrated to a provider network environment, some customer workloads need to remain on premises ("on-prem") due to low latency, high data volume, data security, or other customer data processing requirements. Exemplary on-prem environments include customer data centers, robotics integrations, field locations, co-location facilities, telecommunications facilities (e.g., near cell towers), and the like. To satisfy customer requirements, the present disclosure relates to the deployment of a substrate-like resources on-prem. The term "provider substrate extension" (PSE) refers to a collection of resources (e.g., hardware, software, firmware, configuration metadata, and the like) that a customer can deploy on-prem (such as in a geographically separate location from the provider network) but that provides the same or similar functionality (e.g., virtualized computing resources) as are provided in the provider network. Such resources may be physically delivered as one or more computer systems or servers delivered in a rack or cabinet such as those commonly found in on-prem locations. The PSE can provide the customer with a set of features and capabilities that can be deployed on-prem similar to those features of a provider network described above. In effect, from the perspective of a customer of a provider network, a PSE represents a local extension of the capabilities of the provider network that can be set up at any desired physical location that can accommodate a PSE (e.g., with respect to physical space, electrical power, internet access, etc.). From the perspective of the provider network itself, a PSE may be considered to be virtually located in the same provider network data centers as the core provider network substrate while being physically located in a customer-selected deployment site. In at least some embodiments, the customer that is physically hosting the PSE can grant permissions to its own customers (e.g., other users of the provider network) to allow those users to launch instances to host their respective workloads within the PSE at the customer's on-prem location and, in some cases, to allow those workloads to access the customer's network.

In at least some embodiments, a PSE may be pre-configured, e.g., by the provider network operator, with the appropriate combination of hardware, software and/or firmware elements to support various types of computing-related resources, and to do so in a manner that meets various local data processing requirements without compromising the security of the provider network itself or of any other customers of the provider network. In at least some embodiments, a PSE generally is managed through the same or a similar set of interfaces that the customer would use to access computing-related resources of within the provider network. For example, the customer can provision, manage, and operate computing-related resources within their on-prem PSE or PSEs at various deployment sites through the provider network using the same application programming interfaces (APIs) or console-based interface that they would otherwise use to provision, manage, and operate computing-related resources within the provider network.

In at least some embodiments, resources of the provider network instantiate various networking components to ensure secure and reliable communications between the provider network and the PSE. Such components can establish one or more secure tunnels (e.g., VPNs) with the PSE. Such components can further divide control plane traffic and data plane traffic and process each type of traffic differently based on factors including the direction of the traffic (e.g., to or from the PSE). In at least some embodiments, a control plane service dynamically provisions and configures these networking components for deployed PSEs. Such a control plane service can monitor the networking components for each PSE and invoke self-healing or repair mechanisms designed to prevent communications with the PSE from being lost due to faults occurring within the provider network.

To leverage the proximity of the PSE to the on-prem deployment site (relative to the less proximate data centers of the provider network), the PSE offers a variety of connectivity options to allow other resources of the customer (i.e., connected to the customer's on-prem network) to communicate with computing-related resources hosted by the PSE. In at least some embodiments, a PSE gateway manages communications between the PSE and the other customer resources. The customer can configure the PSE gateway by issuing one or more API calls to an interface of the provider network which results in control plane commands being sent to the PSE. The PSE in turn handles traffic sent or relayed to the PSE by other devices in the customer's on-prem site and vice versa.

The disclosed systems and techniques also shield the provider network from potential security issues that could be enabled by connecting a PSE to the provider network. In some embodiments, PSEs can require secure networking tunnels from the customer site at which they are installed to the provider network substrate (e.g., the physical network of machines) in order to operate. These tunnels can include virtual infrastructure components hosted both in virtualized computing instances (e.g., VMs) and on the substrate. Examples of tunnel components include VPCs and proxy computing instances and/or containers running on computing instances. Each server in a PSE may use at least two tunnels, one for control plane traffic and one for data plane traffic. As described in further detail below, intermediary resources positioned along the network path between the provider network substrate and the PSE can securely manage traffic flowing between the substrate and the PSE.

In at least some embodiments, the provider network is a cloud provider network. A cloud provider network, or "cloud," refers to a large pool of accessible virtualized computing resources (such as compute, storage, and networking resources, applications, and services). The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network). A PSE as described herein can also connect to one or more availability zones via a publicly accessible network.

The cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

As one skilled in the art will appreciate in light of this disclosure, certain embodiments may be capable of achieving various advantages, including some or all of the following: (a) enabling customers of a provider network operator to deploy a wide variety of applications in a location-independent manner using provider-managed infrastructure (e.g., PSEs) at sites selected by customers while still retaining the scalability, security, availability and other operational advantages made possible by a provider network, (b) reducing the amount of application data and results that have to be transferred over long distances, such as over links between customer data centers and provider network data centers, (c) improving the overall latencies and responsiveness of applications for which potentially large amounts of data may be consumed as input or produced as output, by moving the applications close to the data sources/destinations, and/or (d) improving the security of sensitive application data.

FIG. 1 is a block diagram illustrating an example provider network extended by a provider substrate extension located within a network external to the provider network according to at least some embodiments. Within a provider network 100, customers can create one or more isolated virtual networks 102. Customers can launch compute instances 101 within an IVN to execute their applications. These compute instances 101 are hosted by substrate addressable devices (SADs) that are part of the provider network substrate (not shown). Similarly, SADs that are part of the provider network substrate can host control plane services 104. Exemplary control plane services 104 include an instance management service (sometimes referred to as a hardware virtualization service) that allows a customer or other control plane service to launch and configure instances and/or IVNs, an object storage service that provides object storage, a block storage services that provides the ability to attach block storage devices to instances, database services that provide various database types, etc.

Note that the components illustrated within the provider network 100 can be treated as logical components. As mentioned, these components are hosted by the SADs of the provider network substrate (not shown). For example, the provider network substrate can host the instances 101 using containers or virtual machines that operate within isolated virtual networks (IVNs). Such containers or virtual machines are executed by SADs. As another example, the provider network substrate can host one or more of the control plane services 104 using SADs in a bare metal configuration (e.g., without virtualization). In at least some embodiments, a SAD refers to the software (e.g., a server) executed by the hardware that is addressable via a network address of the provider network rather than of another network (e.g., a customer network, an IVN, etc.). In at least some embodiments, a SAD may additionally refer to the underlying hardware (e.g., computer system) executing the software.

As illustrated, the provider network 100 is in communication with a provider substrate extension (PSE) 188 deployed within customer network 185 and a PSE 198 deployed within customer network 195. Each PSE includes one or more substrate addressable devices (SADs), such as SADs 189A-189N illustrated within PSE 188. Such SADs 189 facilitate the provisioning of computing-related resources within the PSE. Note that the illustration of a solid box-ellipses-dashed box combination for a component, such as is the case for SADs 189A-189N, generally is used to indicate that there may be one or more of those components in this and subsequent drawings (although references in the corresponding text may refer to the singular or plural form of the component and with or without the letter suffix). A customer gateway/router 186 provides connectivity between the provider network 100 and the PSE 188 as well as between the PSE 188 and other customer resources 187 (e.g., other on-prem servers or services connected to the customer network 185). Similarly, a customer gateway/router 196 provides connectivity between the provider network 100 and the PSE 198 as well as between the PSE 198 and other customer resources 197. Various connectivity options exist between the provider network 100 and PSEs 198, such as a public network like the internet as shown for PSE 188 or a direct connection as shown for PSE 198.

Within the provider network 100, control plane traffic 106 generally (though not always) is directed to SADs, while data plane traffic 104 generally (though not always) is directed to instances. For example, some SADs can vend an API that allows for the launch and termination of instances. A control plane service 104 can send a command via the control plane to the API of such a SAD to launch a new instance in IVN 102.

An IVN, as suggested by the name, may comprise a set of hosted (e.g., virtualized) resources that is logically isolated or separated from other resources of the provider network (e.g., other IVNs). A control plane service can set up and configure IVNs, including assigning each IVN an identifier to distinguish it from other IVNs. The provider network can offer various ways to permit communications between IVNs, such as by setting up peering relationships between IVNs (e.g., a gateway in one IVN configured to communicate with a gateway in another IVN).

IVNs can be established for a variety of purposes. For example, an IVN may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN (or more generally from outside the IVN).

Tunneling techniques facilitate the traversal of IVN traffic between instances hosted by different SADs on the provider network 100. For example, a newly launched instance within IVN 102 might have an IVN address A and be hosted by a SAD with a substrate address X, while the instance 101 might have IVN address B and be hosted by a SAD with a substrate address Y. To facilitate communications between these compute instances, SAD X encapsulates a packet sent from the newly launched instance to the instance 101 (from IVN address A to IVN address B) within a payload of a packet having addressing information of the SADs that host the respective instances (from substrate address X to substrate address Y). The packet sent between the SADs can further include an identifier of IVN 102 to indicate the data is destined for IVN 102 as opposed to another IVN hosted by the SAD with substrate address Y. In some embodiments, the SAD further encrypts the packet sent between instances within the payload of the packet sent between SADs using an encryption key associated with the IVN. In at least some embodiments, the encapsulation and encryption are performed by a software component of the SAD hosting the instance.

For PSEs, the provider network 100 includes one or more networking components to effectively extend the provider network substrate outside of the provider network 100 to the PSE connected to the customer's on-prem network. Such components can ensure that data plane and control plane operations that target a PSE are securely, reliably, and transparently communicated to the PSE. In the illustrated embodiment, a PSE interface 108, a PSE SAD proxy 110, and a PSE SAD anchor 112 facilitate data and control plane communications between the provider network 100 and the PSE 188. Similarly, a PSE interface 118, a PSE SAD proxy 120, and a PSE SAD anchor 122 facilitate data and control plane communications between the provider network 100 and the PSE 198. As described herein, PSE interfaces receive control and data plane traffic from the provider network, send such control plane traffic to a PSE SAD proxy, and send such data plane traffic to a PSE. PSE interfaces also receive data plane traffic from the PSE and send such data plane traffic to the appropriate destination within the provider network. PSE SAD proxies receive control plane traffic from PSE interfaces and send such control plane traffic to PSE SAD anchors. PSE SAD anchors receive control plane traffic from PSE SAD proxies and send such control plane traffic to a PSE. PSE SAD anchors also receive control plane traffic from a PSE and send such control plane traffic to a PSE SAD proxy. PSE SAD proxies also receive control plane traffic from PSE SAD anchors and send such control plane traffic to the appropriate destination within the provider network. Other embodiments may employ different combinations or configurations of networking components to facilitate communications between the provider network 100 and PSEs (e.g., the functionality of the PSE interface, PSE SAD proxy, and/or PSE SAD anchors may be combined in various ways such as by an application that performs the operations of both a PSE interface and a PSE SAD proxy, of both a PSE SAD proxy and a PSE SAD anchor, of all three components, and so on).

As indicated above, each PSE has one or more substrate network addresses for the SADs (e.g., SADs 189A-189N). Since those substrate addresses are not directly reachable via the provider network 100, the PSE interfaces 108, 118 masquerade with attached virtual network addresses (VNAs) matching the substrate addresses of the respective PSE. As illustrated, the PSE interface 108 has attached VNA(s) 150 that match the PSE 188 SAD address(es), and the PSE interface 118 has attached VNA(s) 152 that match the PSE 198 SAD address(es)). For example, traffic destined for a SAD with Internet Protocol (IP) address 192.168.0.10 within PSE 188 is sent to PSE interface 108 having an attached virtual address of 192.168.0.10, and traffic destined for a SAD with IP address 192.168.1.10 within PSE 198 is sent to PSE interface 118 having an attached virtual address of 192.168.1.10. Note that IPv4 or IPv6 addressing may be used. In at least some embodiments, a VNA is a logical construct enabling various networking-related attributes such as IP addresses to be programmatically transferred between instances. Such transfers can be referred to as "attaching" a VNA to an instance and "detaching" a VNA from an instance.

At a high level, a PSE interface is effectively a packet forwarding component that routes traffic based on whether that traffic is control plane traffic or data plane traffic. Note that both control and data plane traffic are routed to a PSE interface as both are destined for a SAD given the substrate addressing and encapsulation techniques described above. In the case of control plane traffic, a PSE interface routes the traffic to the PSE SAD proxy based on the SAD address. In the case of data plane traffic, a PSE interface establishes and serves as an endpoint to one or more encrypted data plane traffic tunnels between the provider network 100 and PSEs (e.g., tunnel 191 between PSE interface 108 and PSE 188, tunnel 193 between PSE interface 118 and PSE 198). For data plane traffic received from the provider network 100, a PSE interface encrypts the traffic for transmission over the tunnel to the PSE. For data plane traffic received from the PSE, the PSE interface decrypts the traffic, optionally validating the SAD-addressing of the packets, and sends the traffic to the identified SAD destination via the provider network 100. Note that if the PSE interface receives traffic from the PSE that does not conform to the expected format (e.g., protocol) used to transmit data plane traffic, the PSE interface can drop such traffic. Further note that if the PSE interface can validate addressing of the encapsulated packet to ensure that the originator of the traffic (e.g., an instance hosted by the PSE within a particular IVN) is permitted to send traffic to the addressed destination (e.g., an instance hosted by provider network within the same or a different IVN).

Each SAD in the PSE has a corresponding group of one or more PSE interfaces and each member of the group establishes one or more tunnels for data plane traffic with the PSE. For example, if there are four PSE interfaces for a PSE having four SADs, the PSE interfaces each establish a secure tunnel with a data plane traffic endpoint for each of the SADs (e.g., sixteen tunnels). Alternatively, a group of PSE interfaces may be shared by multiple SADs by attaching the associated VNAs to each member of the group.

Each PSE has one or more PSE SAD proxies and one or more PSE SAD anchors that handle control plane traffic between the provider network 100 and the SADs of a PSE. Control plane traffic typically has a command-response or request-response form. For example, a control plane service of the provider network 100 can issue a command to a PSE SAD to launch an instance. Since management of PSE resources is facilitated from the provider network, control plane commands sent over the secure tunnel typically should not originate from a PSE. At a high level, a PSE SAD proxy acts as a stateful security boundary between the provider network 100 and a PSE (such a boundary is sometimes referred to as a data diode). To do so, a PSE SAD proxy can employ one or more techniques such as applying various security policies or rules to received control plane traffic. Note that other control plane services 104 can indirectly or directly offer a public-facing API to allow instances hosted by a PSE to issue commands to the provider network 100 via non-tunneled communications (e.g., over a public network such as the internet).

For traffic originating from within the provider network 100 and destined for a PSE, a PSE SAD proxy can provide a control plane endpoint API of its corresponding SAD within the PSE. For example, a PSE SAD proxy for a PSE SAD that can host instances can provide an API consistent with one that can receive control plane operations to launch, configure, and terminate instances. Depending on the API call and associated parameters destined for a PSE SAD and received by a PSE SAD proxy, the PSE SAD proxy can perform various operations. For some operations, the PSE SAD proxy can pass the operation and associated parameters without modification through to the destination SAD. In some embodiments, a PSE SAD proxy can verify that the parameters of a received API call from within the provider network 100 are well-formed relative to the API before passing through those operations.

For some API calls or associated parameters, the PSE SAD can act as an intermediary to prevent sensitive information from being sent outside of the provider network 100. Exemplary sensitive information includes cryptographic information such as encryption keys, network certificates, etc. For example, a PSE SAD proxy can decrypt data using a sensitive key and re-encrypt the data using a key that can be exposed to a PSE. As another example, a PSE SAD proxy can terminate a first secure session (e.g., a Transport Layer Security (TLS) Session) originating from within the provider network 100 and create a new secure session with the corresponding SAD using a different certificate to prevent provider network certificates from leaking to the PSE. Thus, a PSE SAD proxy can receive certain API calls from within the provider network 100 that includes sensitive information and issue a substitute or replacement API call to the PSE SAD that replaces the sensitive information.

For traffic originating from a PSE and destined for the provider network 100, a PSE SAD proxy can drop all control plane commands or requests that originate from the PSE or only those commands or requests not directed to a public-facing control plane endpoint within the provider network, for example.

In some embodiments, a PSE SAD proxy can process responses to control plane operations depending on the nature of an expected response, if any. For example, for some responses, the PSE SAD proxy can simply drop the response without sending any message to the originator of the corresponding command or request. As another example, for some responses the PSE SAD proxy can sanitize the response to ensure it complies with the expected response format for the corresponding command or request before sending the sanitized response to the originator of the corresponding command or request via control plane traffic 107. As yet another example, the PSE SAD proxy can generate a response (whether immediately or upon receipt of an actual response from the SAD) and send the generated response to the originator of the corresponding command or request via control plane traffic 107.

As part of acting as a security boundary between the provider network 100 and a PSE, a PSE SAD proxy can track the state of communications between components of the provider network (e.g., control plane services 104) and each SAD of the PSE. State data can include session keys for the duration of sessions, pending outbound API calls with an associated source and destination to track outstanding responses, the relationship between API calls received from within the provider network 100 and those API calls that were issued to a SAD with replaced or substituted sensitive information, etc.

In some embodiments, the PSE SAD proxy can provide stateful communications for other PSE-to-provider network communications in addition to control plane traffic. Such communications can include Domain Name System (DNS) traffic, Network Time Protocol (NTP) traffic, and operating system activation traffic (e.g., for Windows activation).

In some embodiments, only certain components of a PSE are capable of serving as endpoints for encrypted control plane traffic tunnels with the provider network 100. To provide redundancy and reliability for the connection between the provider network 100 and PSE, a PSE SAD anchor can serve as the provider-network side endpoint for each of the available tunnel endpoints of the PSE. As illustrated, PSE SAD anchor(s) 112 serve to tunnel control plane traffic to the PSE 188 via tunnel 190, and PSE SAD anchor(s) 122 serve to tunnel control plane traffic to the PSE 1198 via tunnel 192.

Various embodiments can limit the radial impact of any attempted attacks originating from outside of the provider network (e.g., should a PSE become comprised) both by using the techniques to process traffic described above as well as by isolating those networking components exposed to traffic from other portions of the provider network 100. In particular, the networking components can operate within one or more IVNs to bound how far an attacker could penetrate thereby protecting both the operations of the provider network and of other customers. Accordingly, various embodiments can instantiate the PSE interfaces, PSE SAD proxies, and the PSE SAD anchors as applications executed by virtual machines or containers that execute within one or more IVNs. In the illustrated embodiment, groups of PSE interfaces for different PSEs run within a multi-tenant IVN (e.g., the PSE interface IVN 132 for PSEs 188 and 198). In other embodiments, each group of PSE interfaces can run in a single-tenant IVN. Furthermore, each group of PSE SAD proxies and each group of PSE SAD anchors for a given PSE run within single-tenant IVNs (e.g., the PSE SAD proxy IVN 134 for PSE 188, the PSE SAD anchor IVN 136 for PSE 188, the PSE SAD proxy IVN 138 for PSE 198, and the PSE SAD proxy IVN 40 for PSE 198).

Note that the redundancy provided by operating multiple instances for each of the networking components (e.g., PSE interfaces, PSE SAD proxies, and PSE SAD anchors) allows the provider network to periodically recycle the instances hosting those components without interrupting PSE-to-provider network communications. Recycling can involve, for example, restarting instances or launching new instances and reconfiguring the other instances with, for example, the address of the recycled instance. Periodic recycling limits the time window during which an attacker could leverage a compromised network component should one become compromised.

A PSE connectivity manager 180 manages the setup and configuration of the networking components providing the connectivity between the provider network 100 and the PSEs. As mentioned above, the PSE interfaces 108, 118, the PSE SAD proxies 110, 120, and the PSE SAD anchors 112, 122 can be hosted as instances by the provider network substrate. The PSE connectivity manager 180 can request or initiate the launch of PSE interface(s), PSE SAD proxy/proxies, and PSE SAD anchor(s) for PSEs as PSEs are shipped to customers and/or as those PSEs come online and exchange configuration data with the provider network. Furthermore, the PSE connectivity manager 180 can further configure the PSE interface(s), PSE SAD proxy/proxies, and PSE SAD anchor(s). For example, the PSE connectivity manager 180 can attach the VNA(s) that correspond to the SADs of the PSE to the PSE interface(s), provide the PSE interface(s) with the address of the PSE SAD proxy/proxies for the PSE SADs, and provide the PSE SAD proxy/proxies with the address of the PSE SAD anchor(s) for the PSE. Furthermore, the PSE connectivity manager 180 can configure the IVNs of the various components to allow, for example, communications between the PSE interface IVN 132 and a PSE SAD proxy IVN for the PSE, and between the PSE SAD proxy IVN to the PSE SAD anchor IVN for the PSE.

Note that to facilitate the establishment of tunnels 190-193, the tunnel endpoints can have one or more attached VNAs or assigned physical network addresses that can receive traffic from outside of their respective network (e.g., from outside of the provider network for PSE interfaces and PSE SAD anchors, from outside of the customer network for the tunnel endpoints of the PSE). For example, the PSE 188 can have a single outward-facing network address and manage communications to multiple SADs using port address translation (PAT) or multiple outward-facing network addresses. Each PSE SAD anchor 112, 122 can have or share (e.g., via PAT) an outward-facing network address, and each PSE interface 108, 118 can have or share (e.g., via PAT) an outward-facing accessible network address.

Figure 2:
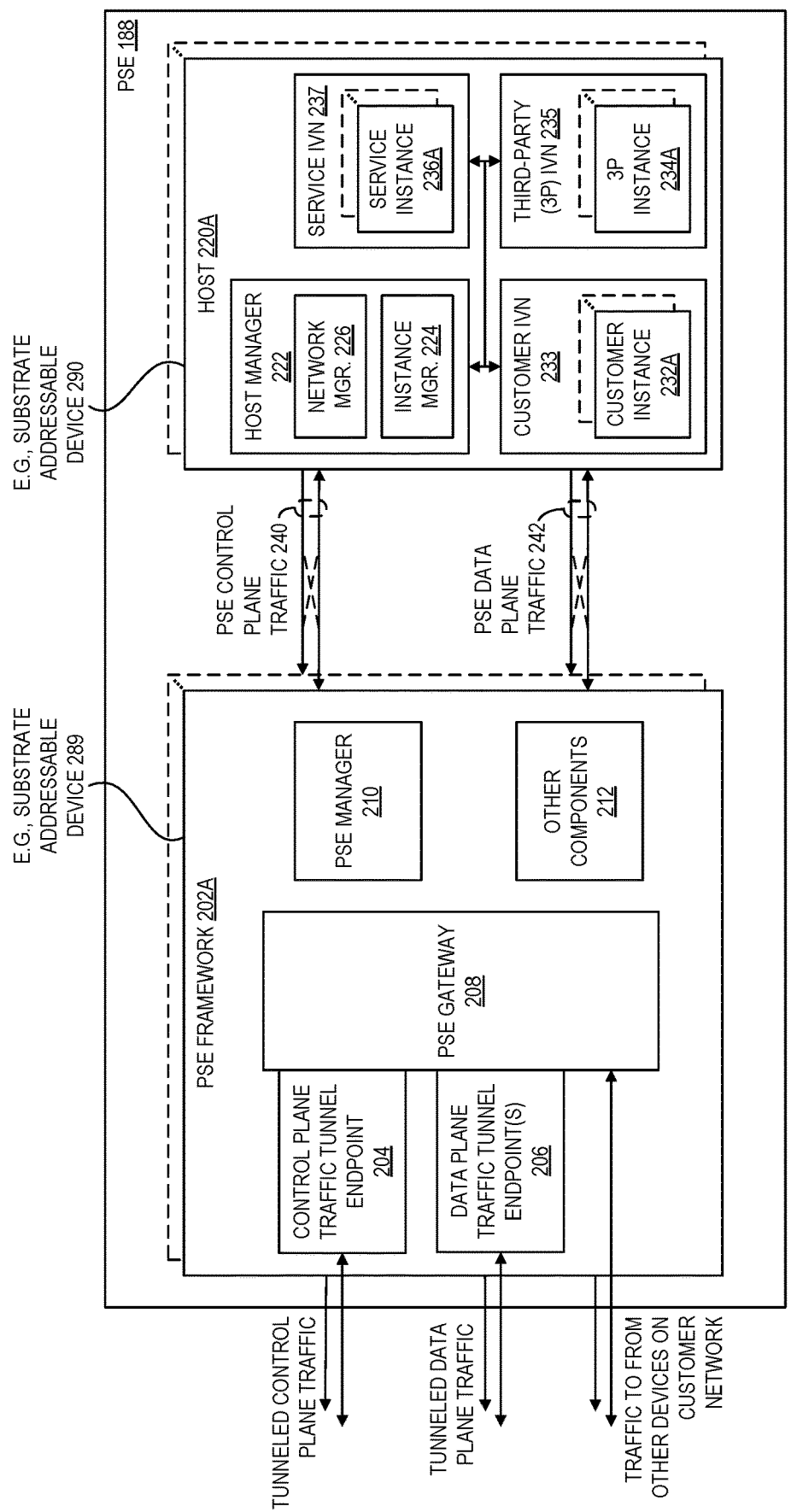
FIG. 2 is a block diagram illustrating an example provider substrate extension according to at least some embodiments.

FIG. 2 is a block diagram illustrating an example provider substrate extension according to at least some embodiments. In the illustrated embodiment, the PSE 188 includes one or more PSE frameworks 202 and one or more hosts 220. At a high level, each host 220 can be functionally (and, possibly, structurally) similar to at least some of the computer systems that form portions of the provider network substrate (e.g., those substrate resources that host instances within the provider network), while the PSE framework(s) 202 provide supporting infrastructure to emulate the provider network substrate within the PSE as well as to provide connectivity to the provider network via control and data plane traffic tunnels (e.g., tunnels 190-193 of FIG. 1).

In at least some embodiments, each PSE framework 202 can send or receive control or data plane traffic from each host 220 and vice versa in a mesh like architecture, as indicated by PSE control plane traffic 240 and PSE data plane traffic 242. Such redundancy allows for reliability levels that a customer might expect from the provider network.

The PSE framework 202 includes one or more control plane tunnel endpoints 204 that terminate encrypted tunnels carrying control plane traffic (e.g., tunnel 190, tunnel 192). In some embodiments, the provider network 100 hosts a PSE SAD anchor for each control plane tunnel endpoint 204. Back in the provider network, the PSE SAD proxy or proxies (e.g., proxies 110) can distribute control plane traffic to the PSE SAD anchors (e.g., anchors 112), effectively distributing the loading of control plane traffic across the PSE frameworks 202 of the PSE 188. The PSE framework 202 further includes one or more data plane tunnel endpoints 206 that terminate encrypted tunnels carrying data plane traffic (e.g., tunnel 191, tunnel 193) from the PSE interfaces of the provider network, which may be connected in a mesh like architecture (e.g., a given PSE interface 108 establishes a tunnel with the data plane tunnel endpoint 206 of each PSE framework 202).

As indicated above, packets of control plane traffic and packets of data plane traffic can include SADs as both source and destinations—the latter being encapsulated in a packet having SAD-based addressing. As illustrated, the PSE framework 202 is SAD 289, and the host 220 is SAD 290. Note that SADs within the PSE 188 (e.g., SAD 289, 290) can also provide secure session termination (e.g., TLS termination) for secure sessions established with the corresponding PSE SAD proxy or proxies within the provider network (e.g., PSE SAD proxies 110).

SADs vend one or more control plane APIs to handle control plane operations directed to the SAD that manage the resources of the SAD. For example, a PSE manager 210 of a PSE framework 202 can vend a control plane API for management of the components of the PSE framework 202. One such component is a PSE gateway 208 that routes control and/or data plane traffic into and out of the PSE 188, such as control plane traffic destined for SAD 289 to the PSE manager 210 and control or data plane traffic destined for SAD 290 to the host manager 222. The PSE gateway 208 can further facilitate communications with the customer network, such as to or from the other customer resources 187 accessible via the network of the PSE deployment site (e.g., the customer network 185).

The API of the PSE manager 210 can include one or more commands to configure the PSE gateway 208 of the PSE framework 202. Other components 212 of the PSE framework 202 can include various applications or services that take part in the operation of the substrate of the PSE for the hosts 220, such as DNS, Dynamic Host Configuration Protocol (DHCP), and/or NTP services.

A host manager 222 can vend a control plane API for management of the components of the host 220. In the illustrated embodiment, the host manager 222 includes an instance manager 224 and a network manager 226. The instance manager 224 can handle API calls related to management of the host 220, including commands to launch, configure, and/or terminate instances hosted by the host 220. For example, an instance management service in the provider network (not shown) can issue a control plane command to the instance manager 224 to launch an instance on host 220. As illustrated, the host 220 is host to a customer instance 232 running inside of a customer IVN 233, a third-party (3P) instance 234 running inside of a 3P IVN 235, and a service instance 236 running inside of a service IVN 237. Note that each of these IVNs 233, 234, 235 can extend existing IVNs established within the provider network. The customer instance 232 may be executing some customer application or workload, the 3P instance 234 may be executing the application or workload of another party that the customer has permitted to launch instances within the PSE 188, and the service instance 236 may be executing a service of the provider network locally to offer to the PSE 188 (e.g., a block storage service, a database service, etc.).

The network manager 226 can handle SAD-addressed data plane traffic received by the host 220. For such traffic, the network manager can perform the requisite decapsulation of an IVN packet before sending it to the addressed, hosted instance. Furthermore, the network manager 226 can handle the routing of traffic sent by hosted instances. When a hosted instance attempts to send traffic to another locally hosted instance (e.g., on the same host), the network manager 226 can forward that traffic to the addressed instance. When a hosted instance attempts to send traffic to a non-local instance (e.g., not on the same host), the network manager 226 can locate the substrate address of the device hosting the non-local instance, encapsulate and optionally encrypt the corresponding packet into a SAD-addressed packet, and send that packet over the data plane (e.g., either to another host within the PSE or back to the provider network via the PSE gateway 208. Note that the network manager 226 can include or have access to various data that facilitates routing of data plane traffic (e.g., to look up the address of the SAD hosting an instance having a IVN network address in the destination of a packet received from a hosted instance).

Figure 3:
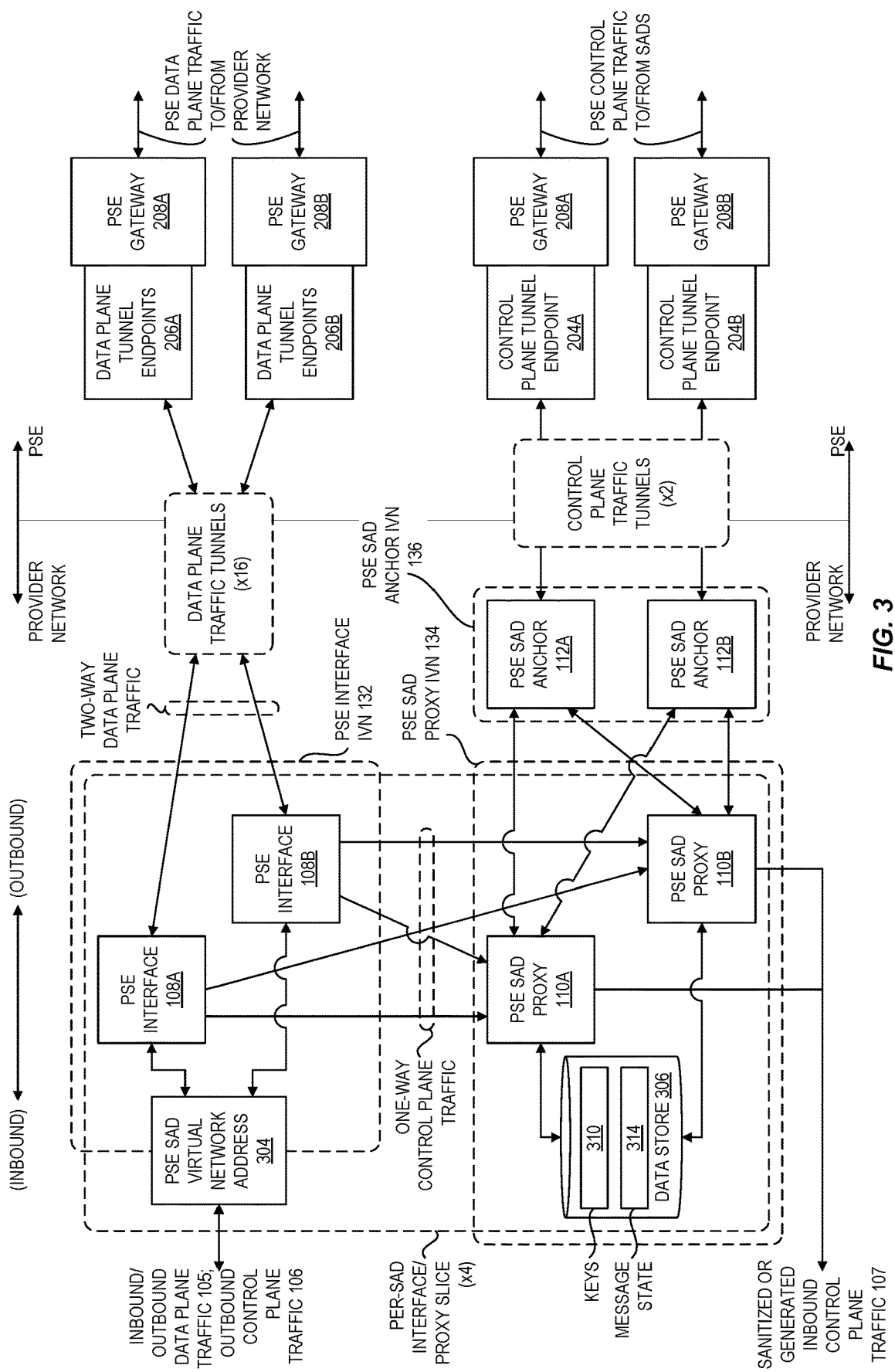
FIG. 3 is a block diagram illustrating an example connectivity between a provider network and a provider substrate extension according to at least some embodiments.

FIG. 3 is a block diagram illustrating an example connectivity between a provider network and a provider substrate extension according to at least some embodiments. In particular, FIG. 3 illustrates an exemplary connectivity between a provider network and a PSE. Note that for FIG. 3, and as indicated at the top of the figure, the term "inbound" refers traffic received by the provider network from the PSE, and the term "outbound" refers to traffic sent by the provider network to the PSE. Although not illustrated, for this example assume the PSE includes two PSE frameworks 202 and two hosts 220 for a total of four SADs. The PSE frameworks provide tunnel endpoints 204A, 204B for control plane traffic tunnel endpoints 206A, 206B for data plane traffic. Outbound traffic is decrypted and sent to the destination within the PSE substrate via the PSE gateways 208A, 208B.

For each of the four SADs, the provider network includes a VNA, one or more PSE interfaces, and one or more PSE SAD proxies. In this example, the provider network includes a PSE SAD VNA 304, two PSE interfaces 108A, 108B and two PSE SAD proxies 110A, 110B for a given PSE SAD. Together, the PSE interface(s) and PSE SAD proxy/proxies can be referred to as a slice as indicated, each slice corresponding to a particular SAD within the PSE. In other embodiments, the PSE interface(s) may be shared by all of the VNAs for a VPN rather than a single VNA for one of the SADs.

The PSE SAD VNA 304 serves as a front for a given PSE through which other components of the provider network can send traffic to and receive traffic from the corresponding SAD of the PSE. A load balancer (not shown) can route outbound traffic sent to the PSE SAD VNA 304 to one of the PSE interfaces 108A, 108B. The illustrated PSE interfaces 108A, 108B for a given slice and those for the other slices (not shown) operate within a PSE interface IVN 132. The PSE interfaces 108A, 108B send data plane traffic to the PSE via data plane traffic tunnels and control plane traffic to the PSE by forwarding the control plane traffic to the PSE SAD proxies 110A, 110B of the slice. The PSE interfaces 108A, 108B store (or have access to) the network addresses of the PSE SAD proxy/proxies of the associated SAD, the network addresses of the data plane tunnel endpoint(s), and one or more keys of or associated with the data plane tunnel endpoint(s) of the PSE for securing communications with those endpoint(s).

In at least some embodiments, the PSE interfaces 108A, 108B establish a secure tunnel for data plane traffic with each data plane tunnel endpoint 206A, 206B resulting in N data plane tunnels where N is the number of PSE interfaces per-SAD (assuming each SAD has the same number of interfaces) multiplied by the number of data plane tunnel endpoints multiplied by the number of SADs. In this example, sixteen data plane tunnels are established between the PSE interfaces and the data plane tunnel endpoints (i.e., 2 PSE interfaces per-SAD×2 data plane tunnel endpoints×4 SADs).

The PSE SAD proxies 110A, 110B receive control plane traffic from the PSE interfaces 108A, 108B, perform various operations described elsewhere herein, and send the control plane traffic to the PSE via either of the two PSE SAD anchors 112A, 112B. Similarly, the PSE SAD proxies 110A, 110B receive control plane traffic from either of the two PSE SAD anchors 112A, 112B, perform various operations described elsewhere herein, and control plane traffic 107 to destinations within the provider network. The illustrated PSE SAD proxies 110A, 110B for a given slice and those for the other slices (not shown) operate within a PSE SAD proxy IVN 134. The PSE interfaces 108A, 108B store (or have access to) the network addresses of the PSE SAD anchor(s).

In at least some embodiments, the PSE SAD proxies have access to a shared data store 306 or otherwise are capable of exchanging information. Such information exchange can be used for a number of reasons. For example, recall that the PSE SAD proxies can vend an API interface to emulate the API interface of the associated SAD within the PSE. Since some communications can be stateful and various load balancing techniques may prevent the same PSE SAD proxy from handling all communications for a given set of operations, one PSE SAD proxy may need to access the state of communications that were previously handled by a different PSE SAD proxy (e.g., the PSE SAD proxy 110A sends a control plane operation to the PSE and the PSE SAD proxy 110B receives a response to the control plane operation from the PSE). For inbound control plane traffic, the PSE SAD proxies can check whether the inbound message is consistent with the expected state and, if so, send a message via control plane traffic 107 as described elsewhere herein. If not, the PSE SAD proxies 110A, 110B can drop the traffic. As another example, recall that the PSE SAD proxies can bridge separate secure sessions (e.g., TLS sessions) to prevent provider network certificates from being sent to the PSE. Again, since the PSE SAD proxy that handles an outbound message may be different than the PSE SAD proxy that handles the response to that message, the PSE SAD proxy handling the responsive message can use the same key that was established between the originator of the outbound message and the PSE SAD proxy that handled the outbound message in order to send a secure responsive message via control plane traffic 107 to the originator.

In this example, each PSE framework provides for a single control plane tunnel endpoint 204. For each of the available control plane tunnel endpoints 204, the provider network includes a PSE anchor. In this example, the provider network includes two PSE anchors 112A, 112B. The PSE SAD anchors 112A, 112B operate within a PSE SAD anchor IVN 136. The PSE anchors 112 receive control plane traffic from each of the eight PSE SAD proxies (two per slice for each of the four SADs) and send that traffic to the PSE. The PSE anchors also receive control plane traffic from the PSE and send that traffic to one of the two PSE SAD proxies associated with the SAD that sourced the traffic from the PSE. The PSE anchors 112A, 112B store (or have access to) the network addresses of the PSE SAD proxy/proxies for each SAD, the network addresses of the control plane tunnel endpoint(s) of the PSE, and one or more keys of or associated with the control plane tunnel endpoint(s) of the PSE for securing communications with those endpoint(s).

In at least some embodiments, the network components or provider network may employ load balancing techniques to distribute the workload of routing control and data plane traffic between the provider network and the PSE. For example, traffic sent to the PSE SAD VNA 304 can be distributed among the PSE interfaces 108A, 108B. As another example, each PSE interface 108 can distribute traffic among the data plane tunnel endpoints 206A, 206B. As yet another example, each PSE interface 108 can distribute traffic among the PSE SAD proxies 110A, 110B. As yet another example, each PSE SAD proxy 110 can distribute outbound traffic among the PSE SAD anchors 112A, 112B. As yet another example, the PSE SAD anchors 112 can distribute inbound traffic among the PSE SAD proxies 110A, 110B. In any case, such load balancing can be performed by the sending entity or by a load balancer (not shown). Exemplary load balancing techniques include employing a load balancer with a single VNA that distributes traffic to multiple components "behind" that address, providing each data sender with the address of multiple recipients and distributing the selected recipient at the application level, etc.

Note that although the embodiments illustrated in FIGS. 1-3 show the establishment of separate tunnels for control plane traffic and data plane traffic, other embodiments might employ one or more tunnels for both control and data plane traffic. For example, the PSE interfaces can route data plane traffic to PSE SAD anchors for transmission over a shared tunnel to the PSE, bypassing the additional operations carried out by the PSE SAD proxies on the control plane traffic.

Figure 4:
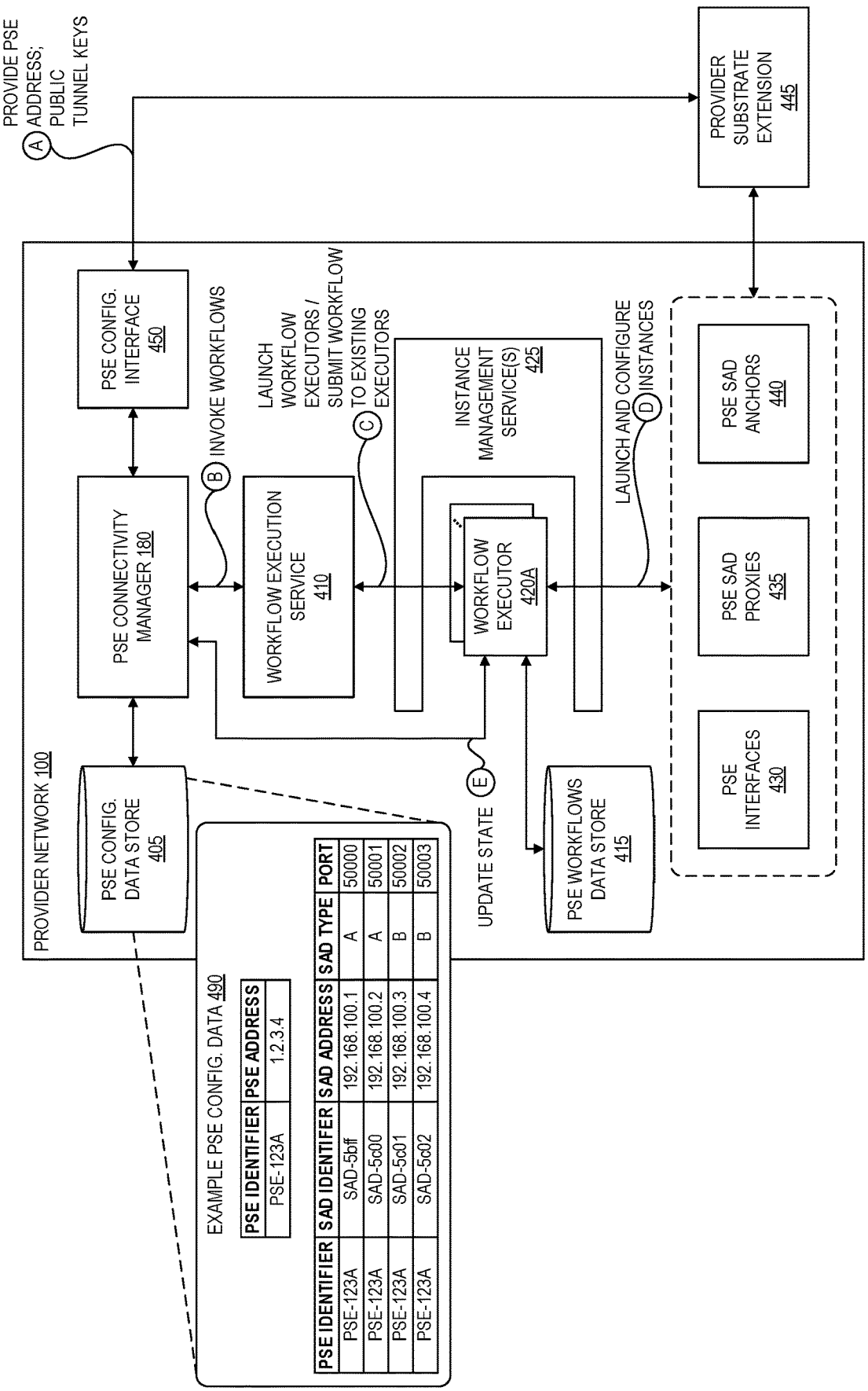
FIG. 4 is a block diagram illustrating an example system for configuring a provider network for communication with a provider substrate extension according to at least some embodiments.

FIG. 4 is a block diagram illustrating an example system for configuring a provider network for communication with a provider substrate extension according to at least some embodiments. The PSE connectivity manager 180 dynamically manages the provider network-side lifecycle of the networking components that facilitate connections with PSEs. When a new PSE is created or launched, or when the contents of the PSE are modified (e.g., by adding, removing, or replacing hosts), the PSE connectivity manager 180 manages operations such as the provisioning of VNAs for PSE interfaces, creating various IVNs for isolation, launching instances to execute the applications performing the operations of the networking components described above, detecting and replacing faulty components, and so on. In at least some embodiments, the PSE connectivity manager 180 is a control plane service that performs such management operations without directly communicating with the PSE, providing additional security between the provider network and PSE.

As illustrated, a PSE configuration interface 450 provides an interface through which PSEs, such as PSE 445, can communicate with the provider network (e.g., via a public facing API) in order to establish tunneled communications. For example, when the PSE 445 comes online, it can reach out to the PSE configuration interface 450 to provide data including the IP address of the PSE and public keys that can be used to establish the secure tunnels between the PSE and the networking components of the provider network 100 as described herein, as indicated at circle A. The PSE configuration interface 450 issues commands to the PSE connectivity manager 180 with the data provided by the PSE indicating that tunneled communications can be established with the PSE 445.

The PSE connectivity manager 180 manages a PSE configuration data store 405. The PSE configuration data store 405 can include, amongst other things, already known details on the hardware and software configuration of a PSE based on its as-built configuration, software updates that have been pushed to the PSE, hardware configuration data that has been received from the PSE, etc. The PSE connectivity manager 180 can update the PSE configuration data store 405 with the data provided by a PSE via PSE configuration interface 450. Exemplary PSE configuration data 490 assumes a PSE connected to a customer network via a single IP address and using PAT to address the individual SADs. The PSE has an identifier PSE-123A to distinguish it from other PSEs that extend the provider network 100. Based on data received at the PSE configuration interface 450, the PSE connectivity manager 180 has indicated that that PSE has an IP address of 1.2.3.4. Existing PSE configuration data indicates that PSE-123A has four SADs with identifiers as shown. Each SAD has an associated substrate address, which may be reserved during the build of the PSE or negotiated with the provider network based on substrate address availability at the time the PSE reaches out to the PSE configuration interface 450. For example, the SAD having the identifier SAD-5bff has a substrate address of 192.168.100.1. Each SAD can have an associated type. For example, some SADs (e.g., PSE frameworks 202) can terminate secure tunnels, some SADs that host instances may have varying compute, memory, and storage resources (e.g., a host with four processors and 128 gigabytes of memory for instances, a host with half that, etc.). In this example, SADs of type A can terminate secure tunnels (e.g., like PSE frameworks 202). Here, since PAT is used to address the SADs of the PSE, the port associated with each SAD is stored in the PSE configuration data 490 (e.g., SAD-5bff can be addressed at 1.2.3.4:50000, and so on).

Based on the configuration of a given PSE, the PSE connectivity manager 180 can initiate one or more workflows to stand up the networking components used to tunnel communications between the provider network 100 and the PSE. To distribute the workload of managing the networking components for a PSE, the PSE connectivity manager 180 can initiate the execution of such workflows via a workflow execution service 410 as indicated at circle B. In various embodiments, a workflow can be treated as a "serverless" function that includes code that can be executed on demand. Serverless functions can be executed on demand, without requiring the initiator to maintain dedicated infrastructure to execute the serverless function. Instead, the serverless functions can be executed on demand using resources maintained by the workflow execution service 410 (e.g., a compute instance, such as a virtual machine or container, etc.). In some embodiments, these resources may be maintained in a "ready" state (e.g., having a pre-initialized runtime environment configured to execute the serverless functions), allowing the serverless functions to be executed in near real-time. In the illustrated embodiment, the resources that execute a workflow are shown as workflow executors 420 as initiated by the workflow execution service 410 as indicated at circle C. Note that the workflow execution service 410 may initiate one or more calls to instance management service(s) 425 depending on whether a workflow executor 420—whether a container, virtual machine, or other environment—needs to be launched for the workflow.

In initiating a workflow, the PSE connectivity manager 180 can send a request to execute a specific workflow to the workflow execution service 410, the request including an identifier that can be used to locate the workflow (e.g., a Uniform Resource Locator (URL), Uniform Resource Identifier (URI), or other reference). The workflow executor 420 assigned the task of executing the workflow can fetch the workflow from a PSE workflows data store 415. Alternatively, the PSE connectivity manager 180 can send the workflow as part of the request to execute it. In addition to identifying or providing a workflow, the PSE connectivity manager 180 can include PSE-specific parameters that are used to configure the networking components for the PSE (e.g., the PSE IP address). Note that in some embodiments, the PSE connectivity manager 180 can execute the workflows directly without the use of the workflow execution service 410.

Workflows, which may be referred to as scripts or functions, include a series of operations (e.g., API calls to other services, storing and retrieving data, etc.). Operations may reference other workflows that can be considered child workflows of the parent. As described above, PSE interface(s), PSE SAD proxy/proxies, and PSE SAD anchor(s) can be software programs executed by instances such as virtual machines or containers. In one embodiment, PSE interface(s) are executed by virtual machines, PSE SAD proxy/proxies are executed by containers, and PSE SAD anchor(s) are executed by containers. In another embodiment, PSE interface(s) are executed by virtual machines, PSE SAD proxy/proxies are executed by containers, and PSE SAD anchor(s) are executed by virtual machines. Other instance types and/or configurations can host the networking components in other embodiments. Accordingly, workflows can include calls to instance management service(s) 425 to launch and configure the instances for a given PSE as indicated at circle D. Such instances can include one or more PSE interfaces 430, one or more PSE SAD proxies 435, and one or more PSE SAD anchors 440.

Several example workflows follow. A first example workflow includes operations to set up communications with a new PSE. The first example workflow operations include creating a VNA for each SAD of the PSE. The first example workflow operations further include updating the PSE configuration data store 405 to assign each SAD the associated VNA. The first example workflow operations further include, per SAD, launching one or more instances within an IVN to perform the operations of PSE interfaces as described herein. The first example workflow operations further include associating the VNA for a given SAD with the one or more PSE interface instances for the SAD. The first example workflow operations further include, per SAD, launching one or more instances within an IVN to perform the operations of a PSE SAD proxies as described herein. The first example workflow operations further include updating the one or more PSE SAD proxy instances for a given SAD with an identification of and/or addressing information for a data store (e.g., to facilitate the exchange of state data, keys, etc.). The first example workflow operations further include updating the one or more PSE interface instances for a given SAD with addressing information for the one or more PSE SAD proxy instances for the same SAD so the PSE interface instances can send control plane traffic to the proxy/proxies for the SAD. The first example workflow operations further include, per control plane tunnel endpoint of the PSE, launching an instance within an IVN to perform the operations of a PSE SAD anchor as described herein. The first example workflow operations further include updating the one or more PSE SAD anchor instances with addressing information for the one or more PSE SAD proxy instances so the PSE SAD anchor instances can send control plane traffic to the proxy/proxies for the SAD. The first example workflow operations further include updating the one or more PSE SAD proxy instances with addressing information for the one or more PSE SAD anchor instances so the PSE SAD proxy instances can send control plane traffic to the anchor(s). The first example workflow operations further include, in cases where the various instances are running within different IVNs, updating the IVN network settings to permit IVN-to-IVN traffic (e.g., from a PSE interface IVN to a PSE SAD proxy IVN, from a PSE SAD anchor IVN to a PSE SAD proxy IVN, and so on).

Note that the above operations of the first example workflow may be carried out in advance of receiving any communications from the PSE such as via the PSE configuration interface 450. Once the PSE has reached out to the provider network (e.g., via the PSE configuration interface 450), several additional workflow operations can be performed. The first example workflow operations further include updating the one or more PSE interface instances and the one or more PSE SAD anchor instances with the PSE addressing information (e.g., of the PSE at the customer network) and PSE public key information. The first example workflow operations further include sending the PSE (e.g., by way of the PSE configuration interface 450) the addressing information of the one or more PSE SAD anchor instances and their associated public keys to facilitate the establishment of the tunnels between the PSE and the provider network.

A second example workflow includes operations to set up communications with a new SAD added to a PSE (e.g., due to a PSE upgrade, a replacement of an existing SAD within a PSE). The second example workflow operations include creating a VNA for the SAD. The second example workflow operations further include updating the PSE configuration data store 405 to assign the SAD the VNA. The second example workflow operations further include launching one or more instances within an IVN to perform the operations of PSE interfaces as described herein (assuming the PSE interface(s) are SAD-specific and not shared amongst a group of SADs). The second example workflow operations further include associating the VNA for a given SAD with the PSE interface instances(s).

If the new SAD does not support additional data plane tunnels, the second example workflow operations further include updating any newly launched PSE interface instances with the PSE addressing information (e.g., of the PSE at the customer network) and PSE public key information.

If the new SAD does support additional data plane tunnels, the second example workflow operations further include updating the newly launched PSE interface instance(s) (if any) with the PSE addressing information (e.g., of the PSE at the customer network) and additional PSE public key information. The second example workflow operations further include updating the existing and the newly launched (if any) PSE interface instances with the PSE addressing information (e.g., of the PSE at the customer network) and PSE public key information of the new SAD.

The second example workflow operations further include launching one or more instances within an IVN to perform the operations of a PSE SAD proxies as described herein. The second example workflow operations further include updating the one or more PSE SAD proxy instances for a given SAD with an identification of and/or addressing information for a data store (e.g., to facilitate the exchange of state data, keys, etc.). The second example workflow operations further include updating the one or more PSE interface instances associated with the new SAD with addressing information for the one or more PSE SAD proxy instances for the same SAD so the PSE interface instances can send control plane traffic to the proxy/proxies for the SAD.

If the new SAD does not support another control plane tunnel, the second example workflow operations further include updating the one or more PSE SAD anchor instances with addressing information for the newly launched one or more PSE SAD proxy instances so the PSE SAD anchor instances can send control plane traffic to the proxy/proxies for the new SAD. The second example workflow operations further include updating the newly launched one or more PSE SAD proxy instances with addressing information for the one or more PSE SAD anchor instances so the PSE SAD proxy instances can send control plane traffic to the anchor(s).

If the new SAD does support another control plane tunnel, the second example workflow operations further include launching an instance within an IVN to perform the operations of a PSE SAD anchor as described herein. The second example workflow operations further include updating the existing and newly launched PSE SAD anchor instances with addressing information for the newly launched PSE SAD proxy instances so the PSE SAD anchor instances can send control plane traffic to the proxy/proxies for the SAD. The second example workflow operations further include updating the existing and the newly launched PSE SAD proxy instances with addressing information for the newly launched PSE SAD anchor instance so the PSE SAD proxy instances can send control plane traffic to the anchor(s).

A third example workflow includes operations to tear down communications with a SAD (e.g., due to a removal or failure of a SAD from a PSE). The third example workflow operations include detaching the VNA for the SAD from the PSE interface instance(s). The third example workflow operations further include terminating and SAD-specific PSE interface instances. The third example workflow operations further include terminating the PSE SAD proxy instance(s) for the SAD. If the removed SAD supports tunnels, the third example workflow operations further include terminating any tunnels between remaining PSE interface instance(s) and the SAD (e.g., if they have not shut down automatically). The third example workflow operations include removing any associations between PSE SAD proxy instances and the PSE SAD anchor instance associated with the removed SAD. The third example workflow operations further include terminating the PSE SAD anchor instance associated with the removed SAD.

A fourth example workflow includes operations to tear down communications with a PSE. The fourth example workflow operations include repeating the operations of the third example workflow for each of the SADs of the PSE as identified in the PSE configuration data 405.

Note that the launch, configuration, or modification of the network components for a PSE can have several interdependencies (e.g., PSE interfaces need to know the network address of PSE SAD proxies, PSE SAD proxies need to know the network address of PSE SAD anchors, PSE SAD anchors and PSE interfaces need to know the public key of the tunnel endpoints of the PSE). Although not shown above, workflows can include calls to the PSE connectivity manager 180 to provide updates on the state of the configuration of network components (e.g., identifiers of instances, etc.) as indicated at circle E. Such state updates can be used to track the process of launching and configuring instances and to track which instances correspond to which network components for a given PSE. For example, the workflow calls to the PSE connectivity manager 180 can capture how, why, and/or when workflows (or segments or portions of a workflow) invoked and completed.

Figure 5:
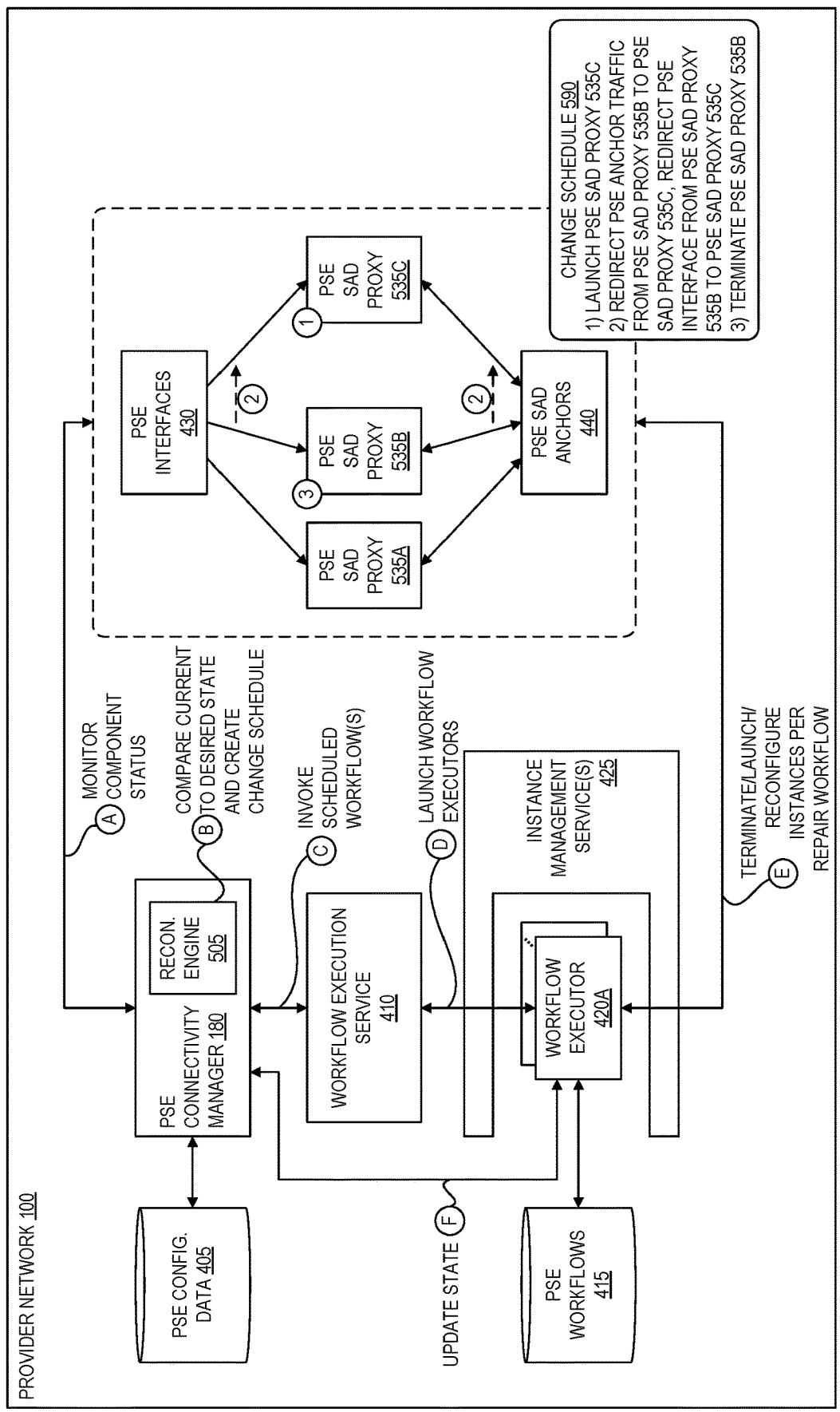
FIG. 5 is a block diagram illustrating an example system for maintaining communications between a provider network and a provider substrate extension according to at least some embodiments.

FIG. 5 is a block diagram illustrating an example system for maintaining communications between a provider network and a provider substrate extension according to at least some embodiments. To improve the reliability of the connectivity between the provider network and the provider substrate extension, the PSE connectivity manager 180 can employ a self-healing reconciliation model to manage the provider-side infrastructure (e.g., VNAs, PSE interfaces, PSE SAD proxies, PSE SAD anchors, etc.). As illustrated, the PSE connectivity manager 180 includes a reconciliation engine 505 that evaluates the actual state of the provider-side infrastructure against the desired or expected state of the provider-side infrastructure based on the configuration of the PSE as indicated in the PSE configuration data 405. For example, the provider-side infrastructure should have at least one PSE SAD anchor for each SAD in a PSE that supports tunnels in some embodiments. In such a case, the reconciliation engine 505 takes one or more actions to eliminate the delta between the desired and actual states.

As indicated at circle A, the PSE connectivity manager 180 can monitor the status of the infrastructure supporting connectivity to a PSE, referred to here as the actual state. Such monitoring may be active or passive. Active monitoring techniques include sending test traffic to the various components (e.g., pings) and verifying the response is as expected. Passive monitoring techniques may inspect traffic patterns into or out of an instance, reported metrics related to network, CPU, and/or memory usage of the instance, or, if the instance is so configured, monitoring the receipt of "heartbeat" traffic sent from the instance to the PSE connectivity manager 180 that indicates the instance is active, etc. In some embodiments, the PSE connectivity manager 180 may instantiate one or more watchdog applications or daemons that execute on the same instance as a network component or on a different instance but within the same IVN as the network component, for example. Such watchdog applications can report health status information to the PSE connectivity manager 180.

For each of the various PSEs that are connected to the provider network, the reconciliation engine 505 can periodically (e.g., once approximately every 60 seconds) compare the actual state to a desired state of the networking components as indicated at circle B. The desired state can refer to the networking components that should be operating for a given PSE (e.g., some specified number of PSE interfaces, some specified number of PSE SAD proxies for each SAD of the PSE, some specified number of PSE SAD anchors for each supported tunnel endpoint by the PSE, etc.). For example, in monitoring the networking components, the PSE connectivity manager 180 may determine that a PSE SAD proxy 535B is non-responsive or otherwise unhealthy. Meanwhile, the configuration data stored in the PSE configuration data store 405 may indicate that each SAD should have two PSE SAD proxies. By comparing the actual state and the desired state, the reconciliation engine 505 can determine that the PSE SAD proxy 535B is not working and generate a change schedule.

At a high level, a change schedule includes one or more workflows (or child workflows) including operations such as those described above with reference to FIG. 4. Example change schedule 590 includes three high-level operations, each of which, in practice, can be composed of a number of operations. Continuing the above example where the PSE SAD proxy 535B is unhealthy, a first operation indicated by circle 1 includes launching and configuring PSE SAD proxy 535C for the PSE. A second operation indicated by circle 2 includes reconfiguring the PSE interface(s) 430 to send traffic to the PSE SAD proxy 535C instead of PSE SAD proxy 535B as well as reconfiguring the PSE SAD anchor 440 to send traffic to the PSE SAD proxy 535C instead of PSE SAD proxy 535B. A third operation indicated by circle 3 includes terminating the instance hosting the PSE SAD proxy 535B.

Based on the generated change schedule, the PSE connectivity manager 180 can invoke scheduled workflows as indicated at circle C such as described with reference to circle B of FIG. 4. The workflow execution service 410 can launch workflow executors 420 as indicated at circle D such as described above with reference to circle C of FIG. 4. The workflow executor(s) 420 can execute the workflows as indicated at circle E such as described above with reference to circle D of FIG. 4. The workflow executor(s) 420 can also provide updates on the state of the configuration of network components as indicated at circle F such as described above with reference to circle E of FIG. 4.

Figure 6:
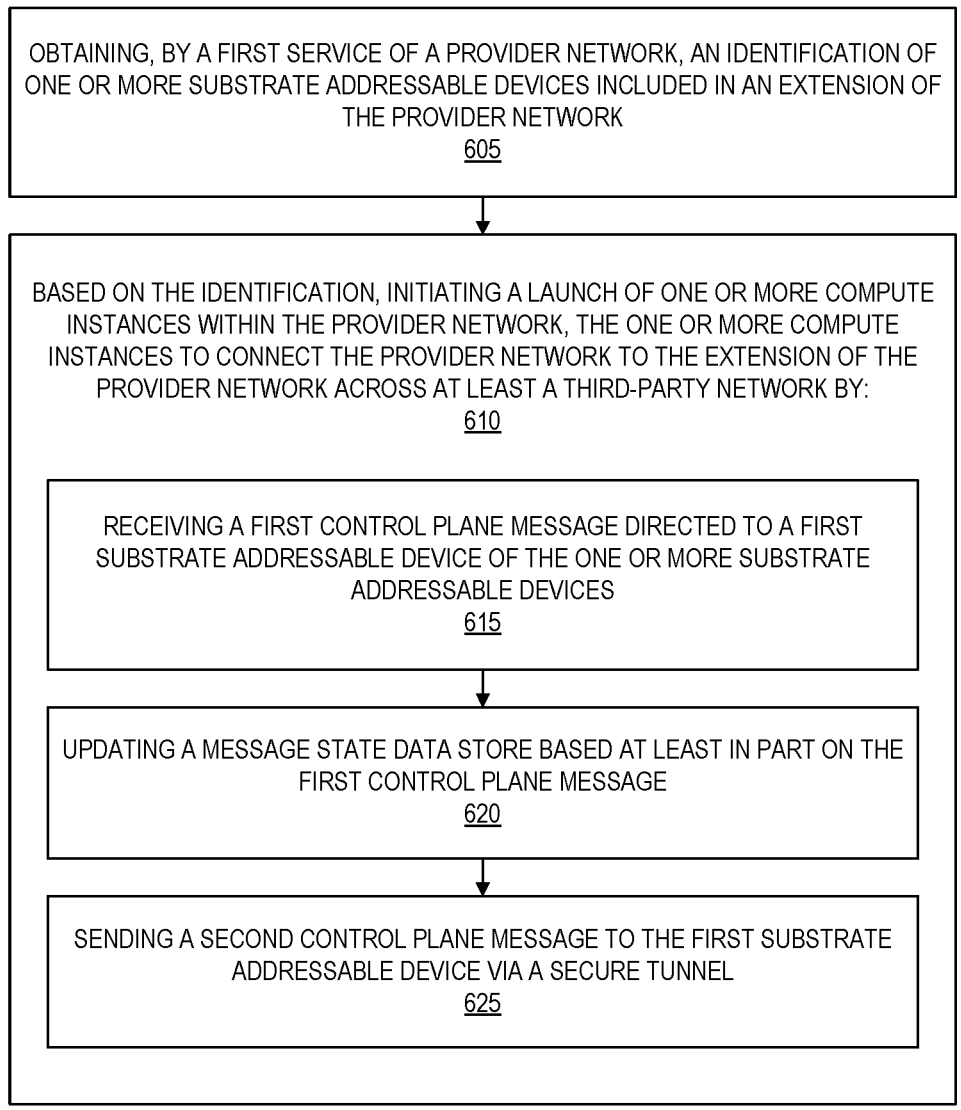
FIG. 6 is a flow diagram illustrating operations of a method for configuring a provider network for communication with a provider substrate extension according to at least some embodiments.

FIG. 6 is a flow diagram illustrating operations of a method for configuring a provider network for communication with a provider substrate extension according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of a provider network, such as services executed by computer systems located within a data center of the provider network. The provider network may be a cloud provider network. The one or more components of the provider network establish communications with an extension of the provider network. The extension of the provider network includes one or more physical computing devices or systems and is remotely located from a data center (e.g., outside of the data center network) of the provider network, such as on the premises of a customer of the provider network. For example, in some embodiments, one or more (or all) of the operations are performed by components of the provider network (e.g., the PSE connectivity manager 180, the workflow execution service 410, the workflow executors 420) of the other figures.

The operations include, at block 605, obtaining, by a first service of a provider network, an identification of one or more substrate addressable devices included in an extension of the provider network. An extension of the provider network, such as the PSEs described herein, can include one or more SADs. The identification of those SADs can be based on a known configuration of the PSE or based on data received from the PSE. A service of the provider network can manage the connectivity to the PSE, such as described herein for the PSE connectivity manager 180. For example, in some embodiments, PSE SAD anchors are instantiated to serve as control plane traffic tunnel endpoints within the provider network, PSE interfaces are instantiated to serve as a local interface for the SADs within the provider network and separate control and data plane traffic, and PSE SAD proxies are instantiated to, inter alia, enforce restrictions or security policies on control plane traffic leaving and entering the provider network for the PSE.

The operations further include, at block 610, based on the identification, initiating a launch of one or more compute instances within the provider network. As described herein, the PSE connectivity manager 180 can directly or indirectly launch one or more instances, such as virtual machines and/or containers, to support the PSE to provider network connectivity. For example, the PSE connectivity manager 180 can engage a workflow execution service 410 to carry out workflows that include operations to launch instances. As another example, the PSE connectivity manager 180 can engage an instance management service to launch instances. The one or more compute instances facilitate the communications between the provider network and the extension of the provider network via at least a third-party network (e.g., a customer network, the internet, etc.) by performing certain operations as outlined in operations 615 through 620.

The operations further include, at block 615, receiving a first control plane message directed to a first substrate addressable device of the one or more substrate addressable devices. As described herein, a provider network typically handles two types of traffic or operations, administrative traffic or operations that may be referred to as part of a control plane of the provider network, and non-administrative traffic or operations that may be referred to as part of a data plane of the provider network. The provider network can employ a virtual network address to serve as an aggregation point for traffic originating within the provider network to be sent to a PSE.

The operations further include, at block 620, updating a message state data store based at least in part on the first control plane message. As described herein, one of the functions performed by the networking components that serve to connect a PSE to the provider network is that of a stateful proxy server for substrate addressable devices of the PSE. Such a proxy server can track the state of traffic sent from the provider network to the PSE and from the PSE to the provider network, performing various operations such as monitoring control plane messages sent to the PSE.

The operations further include, at block 625, sending a second control plane message to the first substrate addressable device via a secure tunnel. As described herein, components of the provider network can establish one or more secure tunnels to a PSE. For example, a PSE SAD anchor can serve as an endpoint to a secure tunnel between the provider network and the PSE.

Figure 7:
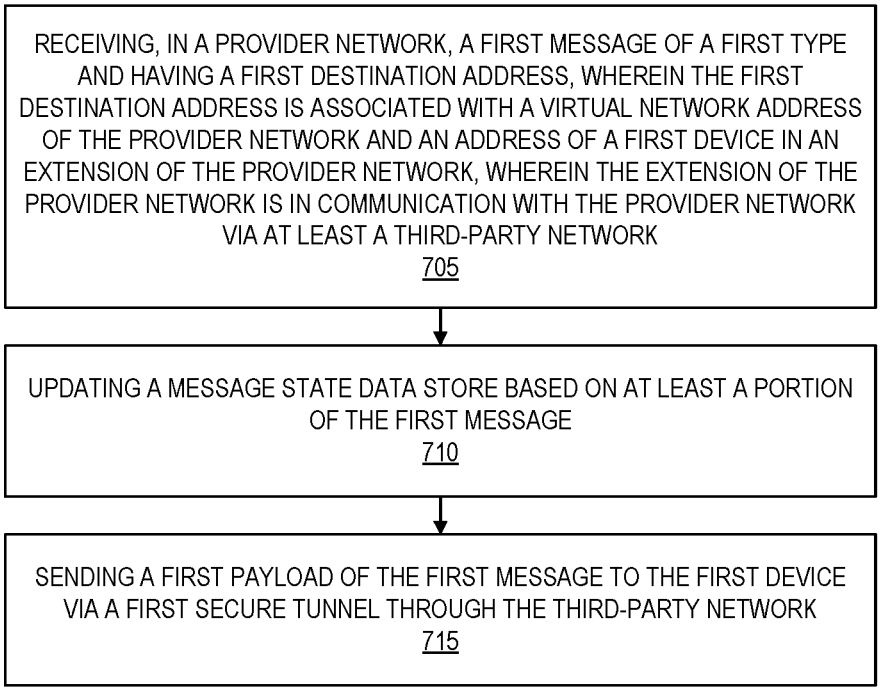
FIG. 7 is a flow diagram illustrating operations of a method for communicating with a provider substrate extension for communication with a network external to a provider network according to at least some embodiments.

FIG. 7 is a flow diagram illustrating operations of a method for communicating with a provider substrate extension for communication with a network external to a provider network according to at least some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are carried out by computer programs or applications executed by one or more components of a provider network, such as services executed by computer systems located within a data center of the provider network. The provider network may be a cloud provider network. The one or more components of the provider network can facilitate communications between other components of the provider network and an extension of the provider network. The extension of the provider network includes one or more physical computing devices or systems and is remotely located from a data center (e.g., outside of the data center network) of the provider network, such as on the premises of a customer of the provider network. For example, in some embodiments, one or more (or all) of the operations are performed by components of the provider network (e.g., PSE interfaces, PSE SAD proxies, PSE SAD anchors) of the other figures.

The operations include, at block 705, receiving, in a provider network, a first message of a first type and having a first destination address, wherein the first destination address is associated with a virtual network address of the provider network and an address of a first device in an extension of the provider network, wherein the extension of the provider network is in communication with the provider network via at least a third-party network. As described herein, one connectivity configuration between a provider network and a PSE involves communicating via one or more secure tunnels (e.g., from a tunnel endpoint within the provider network to a tunnel endpoint within the PSE via a customer network, the internet, etc.). One or more compute instances hosted within the provider network can perform various functions to facilitate communications between devices and/or hosted instances of the provider network and devices and/or hosted instances of the PSE. To provide a virtual presence for substrate addressable devices of a PSE within the provider network, a VNA can be attached to a compute instance hosted within the provider network to allow the compute instance to masquerade as the SAD within the PSE.

The operations further include, at block 710, updating a message state data store based on at least a portion of the first message. As described herein, a PSE SAD proxy can serve as a stateful communications boundary for certain traffic between the PSE and the provider network, performing various operation on traffic originating from other components within the provider network and destined to the PSE and on traffic originating from the PSE and destined for other components of provider network. Such operations can include tracking the state of communications between sources and destinations. For example, a command to launch a compute instance hosted by a device of the PSE can originate within the provider network. The PSE SAD proxy can track the command and associated response in a data store.

The operations further include, at block 715, sending a first payload of the first message to the first device via a first secure tunnel through the third-party network. As described herein, a PSE SAD proxy can perform various operations depending on the nature of the traffic traversing the secure tunnel between the provider network and the PSE. For example, for some types of traffic, the PSE SAD proxy can relay a received message through to the PSE. For other types of traffic, the PSE SAD proxy can re-encapsulate the payload of a received message and send it in a new message to the PSE (e.g., to terminate and bridge secure sessions).

Figure 8:
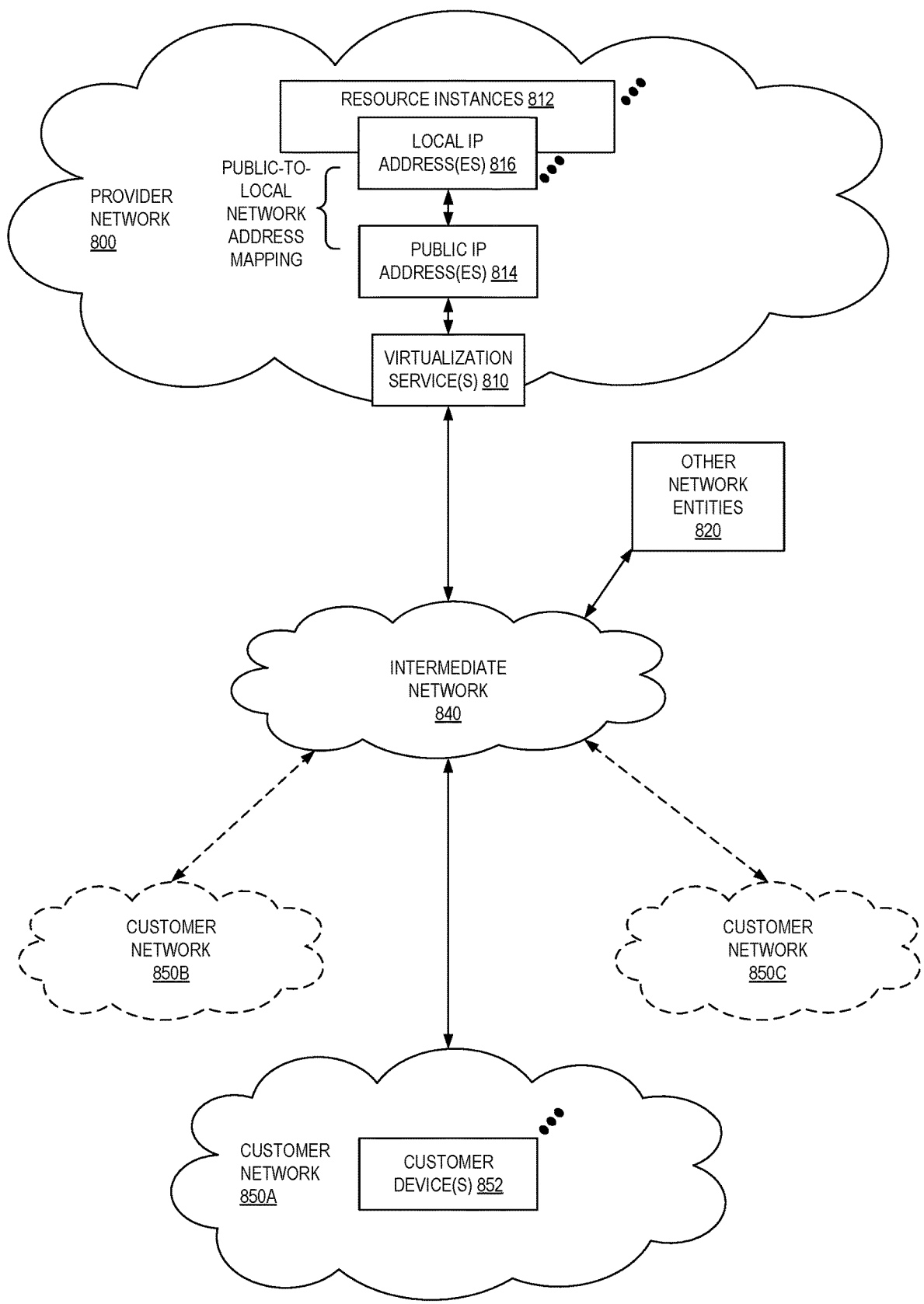
FIG. 8 illustrates an example provider network environment according to at least some embodiments.

FIG. 8 illustrates an example provider network (or "service provider system") environment according to at least some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
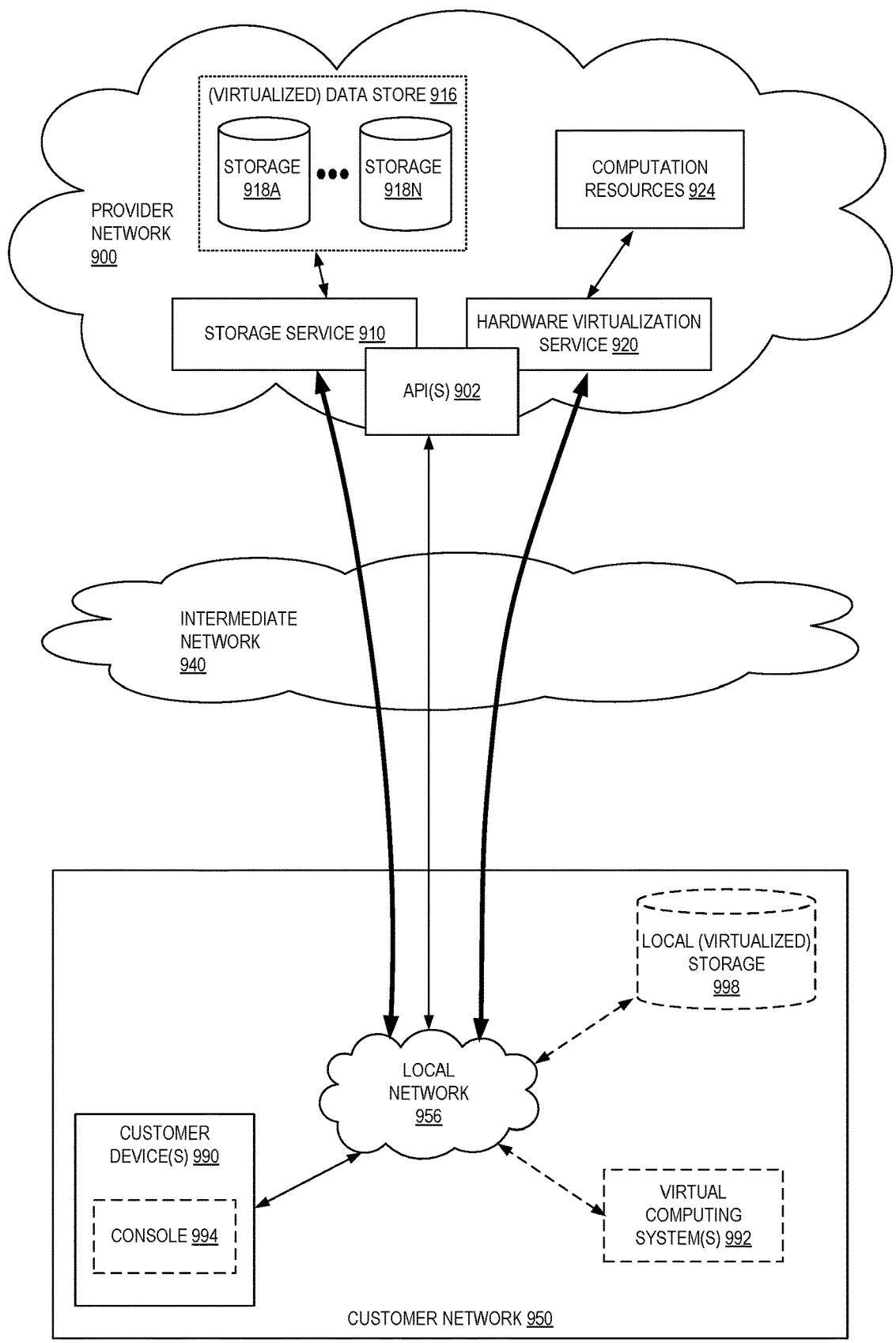
FIG. 9 is a block diagram of an example provider network that provides a storage service and a hardware virtualization service to customers according to at least some embodiments.

FIG. 9 is a block diagram of an example provider network that provides a storage service and a hardware virtualization service to customers according to at least some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
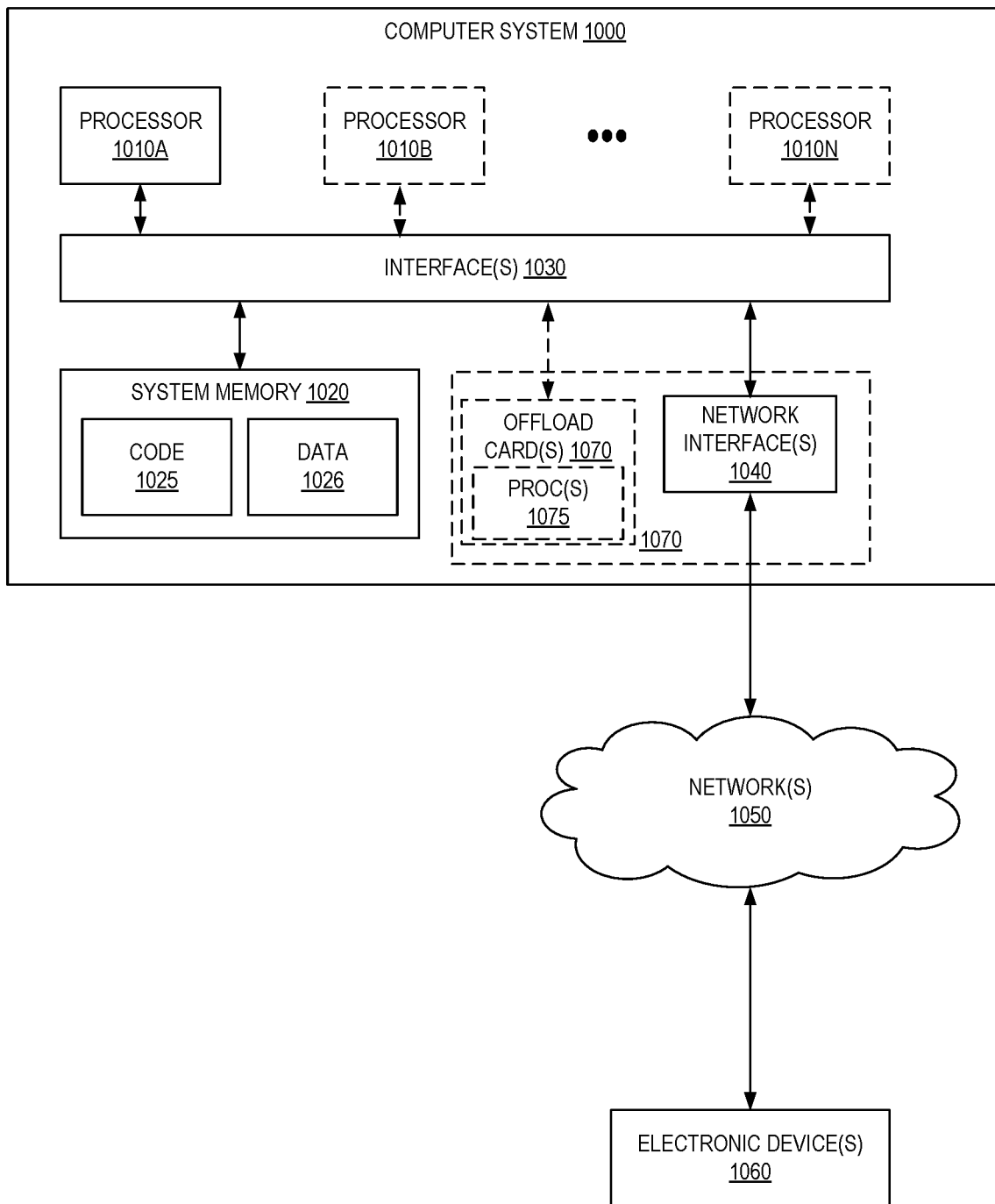
FIG. 10 is a block diagram illustrating an example computer system that may be used in at least some embodiments.

FIG. 10 is a block diagram illustrating an example computer system that may be used in at least some embodiments. In at least some embodiments, such a computer system can be used as a server that implements one or more of the control-plane and/or data-plane components that are used to support the provider substrate and/or PSE described herein and/or various virtualized components (e.g., virtual machines, containers, etc.). Such a computer system can include a general- or special-purpose computer system that includes or is configured to access one or more computer-accessible media. In at least some embodiments, such a computer system can also be used to implement components outside of the provider substrate and/or provider substrate extension (e.g., the customer gateway/router 186, other customer resources 187, and the like). In the illustrated embodiment of a computer system, the computer system computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor. With reference to FIG. 2, in at least some embodiments the PSE framework 202 and at least a portion of the functionality of the host manager 222 execute on the one or more processors 1075 of the offload cards 1070 while the instances (e.g., 232, 234, 236) execute on the one or more processors 1010.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 101A, 102A, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining, by a first service of a provider network, an identification of one or more substrate addressable devices included in an extension of the provider network, wherein the extension of the provider network comprises provider hardware resources deployed at a customer-selected site within a customer network, and wherein the provider hardware resources comprise a provider-managed server; and
   based on the identification, initiating, by the first service, a launch of a plurality of compute instances within the provider network by a second service of the provider network, wherein the plurality of compute instances connect the provider network to the extension of the provider network via at least a third-party network, wherein the plurality of compute instances include:
      a first compute instance to establish a secure tunnel to the extension of the provider network via the third-party network; and
      a second compute instance to proxy control plane traffic to a first substrate addressable device of the one or more substrate addressable devices, wherein the second compute instance is to:
         receive a first control plane message directed to the first substrate addressable device;
         update a message state data store based at least in part on the first control plane message; and
         send a second control plane message to the first compute instance for transmission to the first substrate addressable device via the secure tunnel.

2. The computer-implemented method of claim 1, further comprising:
   monitoring, by the first service, an actual state of the plurality of compute instances;
   determining, by the first service, that a third compute instance of the plurality of compute instances is causing the actual state of the plurality of compute instances to not match a desired state of the plurality of compute instances, wherein the desired state of the plurality of compute instances is based at least in part on the identification;
   initiating, by the first service, the launch of a fourth compute instance by the second service, wherein the fourth compute instance is to replace the third compute instance; and
   sending an identification of the fourth compute instance to at least one of the plurality of compute instances other than the third compute instance.

3. The computer-implemented method of claim 1, further comprising:
   receiving, from the extension of the provider network, a public key associated with a control plane traffic tunnel endpoint of the extension; and
   sending the public key to a third compute instance of the plurality of compute instances, the third compute instance serving as a control plane traffic tunnel endpoint of the provider network.

4. A computer-implemented method comprising:
   obtaining, by a first service of a provider network, an identification of one or more substrate addressable devices included in an extension of the provider network, wherein the extension of the provider network comprises provider hardware resources deployed at a customer-selected site within a customer network, and wherein the provider hardware resources comprise a provider-managed server; and
   based on the identification, initiating a launch of one or more compute instances within the provider network, the one or more compute instances to connect the provider network to the extension of the provider network across at least a third-party network by:
      receiving a first control plane message directed to a first substrate addressable device of the one or more substrate addressable devices;
      updating a message state data store based at least in part on the first control plane message; and
      sending a second control plane message to the first substrate addressable device via a secure tunnel.

5. The computer-implemented method of claim 4:
   wherein the first control plane message includes an identifier of a source of the first control plane message and a call to an application programming interface (API) of the first substrate addressable device; and wherein the updating the message state data store includes storing the identifier of the source and an indication of the call to the API.

6. The computer-implemented method of claim 4, further comprising attaching a virtual network address to at least one compute instance of the one or more compute instances, wherein the virtual network address matches a substrate address of the first substrate addressable device of the one or more substrate addressable devices.

7. The computer-implemented method of claim 4, wherein initiating the launch of the one or more compute instances within the provider network comprises:
    sending, by the first service to a workflow execution service of the provider network, a request to execute a workflow that includes an operation to launch at least one compute instance of the one or more compute instances; and
    executing, by a workflow executor managed by the workflow execution service, the workflow.

8. The computer-implemented method of claim 4, further comprising:
    monitoring an actual state of the one or more compute instances;
        determining that a third compute instance of the one or more compute instances is causing the actual state of the one or more compute instances to not match a desired state of the one or more compute instances, wherein the desired state of the one or more compute instances is based at least in part on the identification; and
        generating a schedule that identifies one or more operations to modify at least one compute instance of the one or more compute instances to reconcile a difference between the actual state and the desired state.

9. The computer-implemented method of claim 8, wherein the monitoring the actual state of the one or more compute instances includes at least one of sending a request for a response to a first compute instance of the one or more compute instances or receiving a message from the first compute instance of the one or more compute instances.

10. The computer-implemented method of claim 8, wherein the one or more operations identified in the schedule include:
    a first operation to launch a fourth compute instance to replace the third compute instance; and
    a second operation to send an identification of the fourth compute instance to at least one of the one or more compute instances other than the third compute instance.

11. The computer-implemented method of claim 4, further comprising:
    receiving, from the extension of the provider network, a public key associated with a tunnel endpoint of the extension; and
    sending the public key to at least one compute instance of the one or more compute instances, the at least one compute instance serving as a tunnel endpoint of the provider network.

12. The computer-implemented method of claim 4, further comprising replacing a first compute instance of the one or more compute instances with a newly launched instance.

13. A system comprising:
    a first one or more electronic devices of an instance management service of a provider network; and
    a second one or more electronic devices of an extension management service of a provider network, the extension management service including instructions that upon execution cause the extension management service to:
        obtain an identification of one or more substrate addressable devices included in an extension of the provider network, wherein the extension of the provider network comprises provider hardware resources deployed at a customer-selected site within a customer network, and wherein the provider hardware resources comprise a provider-managed server; and
        based on the identification, initiate a launch of one or more compute instances within the provider network via the instance management service, the one or more compute instances to connect the provider network to the extension of the provider network across at least a third-party network, the one or more compute instances to:
            receive a first control plane message directed to a first substrate addressable device of the one or more substrate addressable devices;
            update a message state data store based at least in part on the first control plane message; and
            send a second control plane message to the first substrate addressable device via a secure tunnel.

14. The system of claim 13, wherein the first control plane message includes an identifier of a source of the first control plane message and a call to an application programming interface (API) of the first substrate addressable device, and wherein the update of the message state data store includes storing the identifier of the source and an indication of the call to the API.

15. The system of claim 13, wherein the extension management service includes further instructions that upon execution cause the extension management service to cause an attachment of a virtual network address to at least one compute instance of the one or more compute instances, wherein the virtual network address matches a substrate address of at least one substrate addressable device of the one or more substrate addressable devices.

16. The system of claim 13, wherein to initiate the launch of the one or more compute instances within the provider network, the extension management service includes further instructions that upon execution cause the extension management service to send a request to execute a workflow to a workflow execution service of the provider network, the request including an operation to launch at least one compute instance of the one or more compute instances via the instance management service, wherein a workflow executor managed by the workflow execution service executes the workflow.

17. The system of claim 13, wherein the extension management service includes further instructions that upon execution cause the extension management service to:
    monitor an actual state of the one or more compute instances;
    determine that a third compute instance of the one or more compute instances is causing the actual state of the one or more compute instances to not match a desired state of the one or more compute instances, wherein the desired state of the one or more compute instances is based at least in part on the identification; and
    generate a schedule that identifies one or more operations to modify at least one compute instance of the one or more compute instances to reconcile a difference between the actual state and the desired state.

18. The system of claim 17, wherein to monitor the actual state of the one or more compute instances includes at least one of sending a request for a response to a first compute instance of the one or more compute instances or receiving a message from the first compute instance of the one or more compute instances.

19. The system of claim 17, wherein the one or more operations identified in the schedule include:
  a first operation to launch a fourth compute instance to replace the third compute instance; and
  a second operation to send an identification of the fourth compute instance to at least one of the one or more compute instances other than the third compute instance.

20. The system of claim 13, wherein the extension management service includes further instructions that upon execution cause the extension management service to:
  receive, from the extension of the provider network, a public key associated with a tunnel endpoint of the extension; and
  send the public key to at least one compute instance of the one or more compute instances, the at least one compute instance serving as a tunnel endpoint of the provider network.

* * * * *